US012379784B2

(12) United States Patent
Rose et al.

(10) Patent No.: US 12,379,784 B2
(45) Date of Patent: *Aug. 5, 2025

(54) MODIFICATION OF THREE-DIMENSIONAL GARMENTS USING GESTURES

(71) Applicant: eBay Inc., San Jose, CA (US)

(72) Inventors: Kyle Smith Rose, West Jordan, UT (US); Pooja Sapra, Midvale, UT (US); Vivienne Melody Blue, Salt Lake City, UT (US); Chuck Barnum, Herriman, UT (US); Giridhar Singam, Taylorsville, UT (US); Chris Miller, North Salt Lake, UT (US); Rachel Maxine Minenno, Sandy, UT (US); James Stephen Perrine, Sandy, UT (US)

(73) Assignee: eBay Inc., San Jose, CA (US)

( * ) Notice: Subject to any disclaimer, the term of this patent is extended or adjusted under 35 U.S.C. 154(b) by 286 days.

This patent is subject to a terminal disclaimer.

(21) Appl. No.: 18/302,703

(22) Filed: Apr. 18, 2023

(65) Prior Publication Data
US 2023/0251724 A1 Aug. 10, 2023

Related U.S. Application Data

(63) Continuation of application No. 17/353,410, filed on Jun. 21, 2021, now Pat. No. 11,662,829, which is a (Continued)

(51) Int. Cl.
G06F 3/01 (2006.01)
G06F 3/03 (2006.01)
(Continued)

(52) U.S. Cl.
CPC ............ G06F 3/017 (2013.01); G06F 3/0304 (2013.01); G06F 3/04815 (2013.01); (Continued)

(58) Field of Classification Search
CPC ...... G06Q 30/0601–0643; G06T 13/20; G06T 13/40; G06T 15/00; G06T 15/005; (Continued)

(56) References Cited

U.S. PATENT DOCUMENTS 5,255,352 A 10/1993 Falk
5,495,568 A 2/1996 Beavin
(Continued)

FOREIGN PATENT DOCUMENTS

CN 102646245 8/2012
CN 102842089 12/2012
(Continued)

OTHER PUBLICATIONS

M. Yuan, I. R. Khan, F. Farbiz, S. Yao, A. Niswar and M.-H. Foo, "A Mixed Reality Virtual Clothes Try-On System," in IEEE Transactions on Multimedia, vol. 15, No. 8, pp. 1958-1968, Dec. 2013, doi: 10.1109/TMM.2013.2280560. (Year: 2013).*
(Continued)

Primary Examiner — William J Allen
(74) Attorney, Agent, or Firm — FIG. 1 Patents

(57) ABSTRACT

Techniques for modifying a garment based on gestures are presented herein. An access module can access a first set of sensor data from a first sensor, and a second set of sensor data from a second sensor. A garment simulation module can generate a three-dimensional (3D) garment model of a garment available for sale draped on an avatar based on the first set of sensor data and the second set of sensor data. A display module can cause a presentation, on a display of a device, of the 3D garment model draped on the avatar. Additionally, the garment simulation module can determine a modification gesture associated with the 3D garment model draped on the avatar based on the first set of sensor data and the second set of sensor data. Furthermore, the
(Continued)

garment simulation module can modify the 3D garment model based on the determined modification gesture.

20 Claims, 8 Drawing Sheets

Related U.S. Application Data continuation of application No. 16/392,093, filed on Apr. 23, 2019, now Pat. No. 11,073,915, which is a continuation of application No. 14/675,241, filed on Mar. 31, 2015, now Pat. No. 10,310,616.

(51) Int. Cl.
*G06F 3/04815* (2022.01)
*G06F 30/20* (2020.01)
*G06Q 30/0601* (2023.01)
*G06T 13/40* (2011.01)
*G06T 19/20* (2011.01)

(52) U.S. Cl.
CPC ......... *G06F 30/20* (2020.01); *G06Q 30/0621* (2013.01); *G06Q 30/0643* (2013.01); *G06T 13/40* (2013.01); *G06T 19/20* (2013.01); *G06T 2210/16* (2013.01); *G06T 2219/2021* (2013.01)

(58) Field of Classification Search
CPC ......... G06T 15/10; G06T 15/20; G06T 19/00; G06T 19/006; G06T 19/20; G06T 2200/04; G06T 2200/08; G06T 2200/24; G06T 2210/00; G06T 2210/16; G06T 2211/00; G06T 2211/428; G06T 2213/00–12; G06T 2215/00–16; G06T 219/024; G06T 219/20; G06T 219/2004; G06T 219/2008; G06T 219/2012; G06T 219/2016; G06T 219/2021; G06T 219/2024; G06F 3/017; G06F 3/0304; G06F 3/04815; G06F 30/20
See application file for complete search history.

(56) References Cited

U.S. PATENT DOCUMENTS

| | | | |
|---|---|---|---|
| 5,930,769 A | 7/1999 | Rose | |
| 6,175,655 B1 | 1/2001 | George et al. | |
| 6,310,627 B1 | 10/2001 | Sakaguchi | |
| 6,415,199 B1 | 7/2002 | Liebermann | |
| 6,546,309 B1 | 4/2003 | Gazzuolo | |
| 6,643,385 B1 | 11/2003 | Bravomalo | |
| 6,813,838 B2 | 11/2004 | McCormick | |
| 7,242,999 B2 | 7/2007 | Wang | |
| 7,308,332 B2 | 12/2007 | Okada et al. | |
| 7,328,119 B1 | 2/2008 | Pryor et al. | |
| 7,354,411 B2 | 4/2008 | Perry et al. | |
| 7,398,133 B2 | 7/2008 | Wannier et al. | |
| 7,548,794 B2 | 6/2009 | Vandergriff et al. | |
| 7,714,912 B2 | 5/2010 | Faisman et al. | |
| 8,090,465 B2 | 1/2012 | Zeng | |
| 8,269,778 B1 | 9/2012 | Baraff et al. | |
| 8,359,247 B2 | 1/2013 | Vock | |
| 8,525,828 B1 | 9/2013 | Bates | |
| 8,659,596 B2 | 2/2014 | Corazza et al. | |
| 8,704,832 B2 | 4/2014 | Taylor et al. | |
| 8,711,175 B2 | 4/2014 | Aarabi | |
| 8,736,606 B2 | 5/2014 | Ramalingam | |
| 8,749,556 B2 | 6/2014 | de Aguiar | |
| 8,797,328 B2 | 8/2014 | Corazza | |
| 8,970,585 B2 | 3/2015 | Weaver | |
| 9,098,873 B2 | 8/2015 | Geisner et al. | |
| 9,378,593 B2 | 6/2016 | Chhugani et al. | |
| 9,383,895 B1 | 7/2016 | Vinayak et al. | |
| 9,460,342 B1 | 10/2016 | Freund et al. | |
| 9,691,161 B1 | 6/2017 | Yalniz et al. | |
| 10,310,616 B2 | 6/2019 | Rose et al. | |
| 10,366,447 B2 | 7/2019 | Zhao et al. | |
| 10,529,009 B2 | 1/2020 | Gadre et al. | |
| 11,073,915 B2 | 7/2021 | Rose et al. | |
| 11,662,829 B2 | 5/2023 | Rose et al. | |
| 2001/0026272 A1 | 10/2001 | Feld et al. | |
| 2002/0004763 A1 | 1/2002 | Lam | |
| 2002/0126328 A1 | 9/2002 | Lehmeier et al. | |
| 2002/0174360 A1 | 11/2002 | Ikeda | |
| 2003/0093330 A1 | 5/2003 | Pabst et al. | |
| 2003/0101105 A1 | 5/2003 | Vock | |
| 2003/0139896 A1 | 7/2003 | Dietz et al. | |
| 2004/0049309 A1 | 3/2004 | Garden et al. | |
| 2004/0083142 A1 | 4/2004 | Kozzinn | |
| 2006/0020482 A1 | 1/2006 | Coulter | |
| 2006/0202986 A1 | 9/2006 | Okada et al. | |
| 2007/0005174 A1 | 1/2007 | Thomas | |
| 2007/0124215 A1 | 5/2007 | Simmons et al. | |
| 2007/0182736 A1 | 8/2007 | Weaver | |
| 2007/0250203 A1 | 10/2007 | Yamamoto et al. | |
| 2008/0140650 A1 | 6/2008 | Stackpole | |
| 2008/0163344 A1 | 7/2008 | Yang | |
| 2008/0201228 A1 | 8/2008 | Gillet et al. | |
| 2008/0201638 A1 | 8/2008 | Nair | |
| 2008/0221403 A1 | 9/2008 | Fernandez | |
| 2008/0255920 A1 | 10/2008 | Vandergriff et al. | |
| 2008/0312765 A1 | 12/2008 | Gardiner et al. | |
| 2009/0002224 A1 | 1/2009 | Khatib et al. | |
| 2009/0018803 A1 | 1/2009 | Ko et al. | |
| 2009/0019053 A1 | 1/2009 | Burgess et al. | |
| 2009/0115777 A1 | 5/2009 | Reyers | |
| 2009/0144639 A1 | 6/2009 | Nims et al. | |
| 2009/0222127 A1 | 9/2009 | Lind | |
| 2009/0276300 A1 | 11/2009 | Shaw et al. | |
| 2010/0030578 A1 | 2/2010 | Siddique et al. | |
| 2010/0049633 A1 | 2/2010 | Wannier et al. | |
| 2010/0082360 A1 | 4/2010 | Chien et al. | |
| 2010/0097395 A1 | 4/2010 | Chang et al. | |
| 2010/0191770 A1 | 7/2010 | Cho | |
| 2010/0280920 A1 | 11/2010 | Scott et al. | |
| 2010/0305909 A1 | 12/2010 | Wolper et al. | |
| 2010/0306082 A1 | 12/2010 | Wolper et al. | |
| 2010/0313141 A1 | 12/2010 | Yu et al. | |
| 2011/0022372 A1 | 1/2011 | Isogai et al. | |
| 2011/0022965 A1 | 1/2011 | Lawrence et al. | |
| 2011/0063208 A1 | 3/2011 | Van Den Eerenbeemd et al. | |
| 2011/0184831 A1 | 7/2011 | Dalgleish | |
| 2011/0191070 A1 | 8/2011 | Ramalingam | |
| 2011/0231278 A1 | 9/2011 | Fries | |
| 2011/0292034 A1 | 12/2011 | Corazza et al. | |
| 2011/0298897 A1 | 12/2011 | Sareen et al. | |
| 2012/0030062 A1 | 2/2012 | Stauffer et al. | |
| 2012/0054059 A1 | 3/2012 | Rele | |
| 2012/0078145 A1 | 3/2012 | Malhi et al. | |
| 2012/0095589 A1 | 4/2012 | Vapnik | |
| 2012/0136755 A1 | 5/2012 | Yang | |
| 2012/0233003 A1 | 9/2012 | Calman et al. | |
| 2012/0281019 A1 | 11/2012 | Tamstorf et al. | |
| 2012/0299912 A1 | 11/2012 | Kapur et al. | |
| 2012/0308087 A1 | 12/2012 | Chao et al. | |
| 2012/0309520 A1 | 12/2012 | Evertt et al. | |
| 2012/0310791 A1 | 12/2012 | Weerasinghe | |
| 2013/0024301 A1 | 1/2013 | Mikan et al. | |
| 2013/0071584 A1 | 3/2013 | Bell | |
| 2013/0108121 A1 | 5/2013 | de Jong | |
| 2013/0110482 A1 | 5/2013 | Ellens | |
| 2013/0113830 A1 | 5/2013 | Suzuki | |
| 2013/0173226 A1 | 7/2013 | Reed et al. | |
| 2013/0215116 A1 | 8/2013 | Siddique et al. | |
| 2013/0258045 A1 | 10/2013 | Wojciech | |
| 2013/0268399 A1 | 10/2013 | Lu et al. | |
| 2013/0317944 A1 | 11/2013 | Huang et al. | |
| 2013/0322685 A1 | 12/2013 | Li et al. | |
| 2014/0035913 A1 | 2/2014 | Higgins et al. | |
| 2014/0114620 A1 | 4/2014 | Grinspun et al. | |
| 2014/0114884 A1 | 4/2014 | Daway | |
| 2014/0129390 A1 | 5/2014 | Mauge et al. | |

(56) References Cited

U.S. PATENT DOCUMENTS

| | | |
|---|---|---|
| 2014/0164902 A1 | 6/2014 | Sager |
| 2014/0168217 A1 | 6/2014 | Kim et al. |
| 2014/0176565 A1 | 6/2014 | Adeyooia et al. |
| 2014/0180864 A1 | 6/2014 | Orlov et al. |
| 2014/0257993 A1 | 9/2014 | Paolini |
| 2014/0267717 A1 | 9/2014 | Pitzer et al. |
| 2014/0270540 A1 | 9/2014 | Spector et al. |
| 2014/0279200 A1 | 9/2014 | Hosein et al. |
| 2014/0279289 A1 | 9/2014 | Steerman |
| 2014/0313192 A1 | 10/2014 | Corazza et al. |
| 2014/0333614 A1 | 11/2014 | Black et al. |
| 2014/0368499 A1 | 12/2014 | Kaur |
| 2015/0130795 A1 | 5/2015 | Chhugani |
| 2015/0134302 A1 | 5/2015 | Chhugani et al. |
| 2015/0134493 A1 | 5/2015 | Su et al. |
| 2015/0134494 A1 | 5/2015 | Su et al. |
| 2015/0134495 A1 | 5/2015 | Naware et al. |
| 2015/0134496 A1 | 5/2015 | Grinblat et al. |
| 2015/0154691 A1 | 6/2015 | Curry et al. |
| 2015/0186977 A1 | 7/2015 | Leonard et al. |
| 2015/0235447 A1 | 8/2015 | Abovitz et al. |
| 2015/0366504 A1 | 12/2015 | Connor |
| 2016/0035061 A1 | 2/2016 | Gadre et al. |
| 2016/0042402 A1 | 2/2016 | Gadre et al. |
| 2016/0062473 A1 | 3/2016 | Bouchat et al. |
| 2016/0063588 A1 | 3/2016 | Gadre et al. |
| 2016/0088284 A1 | 3/2016 | Sareen et al. |
| 2016/0092956 A1 | 3/2016 | Su et al. |
| 2016/0117749 A1 | 4/2016 | Desmarais et al. |
| 2016/0155186 A1 | 6/2016 | Su et al. |
| 2016/0165988 A1 | 6/2016 | Glasgow et al. |
| 2016/0165989 A1 | 6/2016 | Glasgow et al. |
| 2016/0171583 A1 | 6/2016 | Glasgow et al. |
| 2016/0180447 A1 | 6/2016 | Kamalie et al. |
| 2016/0180449 A1 | 6/2016 | Naware et al. |
| 2016/0180562 A1 | 6/2016 | Naware et al. |
| 2016/0210602 A1 | 7/2016 | Siddique et al. |
| 2016/0247017 A1 | 8/2016 | Sareen et al. |
| 2016/0249699 A1 | 9/2016 | Inghirami |
| 2016/0260150 A1 | 9/2016 | Ackerman |
| 2016/0292779 A1 | 10/2016 | Rose et al. |
| 2016/0292915 A1 | 10/2016 | Chhugani et al. |
| 2017/0004567 A1 | 1/2017 | Dutt et al. |
| 2019/0250717 A1 | 8/2019 | Rose et al. |
| 2021/0311559 A1 | 10/2021 | Rose et al. |

FOREIGN PATENT DOCUMENTS

| | | |
|---|---|---|
| CN | 102902868 | 1/2013 |
| CN | 103105927 | 5/2013 |
| CN | 103455501 | 12/2013 |
| CN | 103605832 | 2/2014 |
| CN | 108292449 | 7/2018 |
| DE | 19922150 | 11/2000 |
| EP | 2091015 | 8/2009 |
| EP | 2187325 | 5/2010 |
| KR | 100960577 | 6/2010 |
| KR | 20140123228 | 10/2014 |
| KR | 1020140123228 | 10/2014 |
| KR | 20140130767 | 11/2014 |
| KR | 1020140130767 | 11/2014 |
| WO | WO-2012110828 | 8/2009 |
| WO | WO-2010060113 | 5/2010 |
| WO | WO-2013188908 | 12/2013 |
| WO | WO-2014182545 | 11/2014 |
| WO | WO-2016106193 | 6/2016 |
| WO | WO-2016106216 | 6/2016 |
| WO | WO-2016106216 A3 | 6/2016 |
| WO | WO-2016160776 | 10/2016 |

OTHER PUBLICATIONS

F. Cordier, Hyewon Seo and N. Magnenat-Thalmann, "Made-to-measure technologies for an online clothing store," in IEEE Computer Graphics and Applications, vol. 23, No. 1, pp. 38-48, Jan.-Feb. 2003, doi: 10.1109/MCG.2003.1159612. (Year: 2003).*

"Examiner Interview Summary", U.S. Appl. No. 14/569,197, Apr. 28, 2017, 2 pages.

"Examiner Interview Summary", U.S. Appl. No. 15/182,267, Jan. 6, 2017, 3 pages.

"Examiner Interview Summary", U.S. Appl. No. 14/580,072, Feb. 1, 2017, 3 pages.

"Examiner Interview Summary", U.S. Appl. No. 13/722,818, Feb. 20, 2015, 3 pages.

"Examiner Interview Summary", U.S. Appl. No. 14/270,244, Apr. 6, 2017, 3 pages.

"Examiner Interview Summary", U.S. Appl. No. 14/578,414, Jun. 7, 2017, 3 pages.

"Examiner Interview Summary", U.S. Appl. No. 14/675,241, Sep. 17, 2018, 3 pages.

"Examiner Interview Summary", U.S. Appl. No. 14/449,120, Oct. 27, 2017, 3 pages.

"Examiner Interview Summary", U.S. Appl. No. 14/449,120, Apr. 21, 2017, 4 pages.

"Final Office Action", U.S. Appl. No. 15/182,267, Mar. 8, 2017, 11 pages.

"Final Office Action", U.S. Appl. No. 13/722,818, Apr. 15, 2015, 16 pages.

"Final Office Action", U.S. Appl. No. 14/675,241, Aug. 28, 2018, 17 pages.

"Final Office Action", U.S. Appl. No. 13/722,818, Jul. 11, 2016, 23 pages.

"Final Office Action", U.S. Appl. No. 14/579,936, Jul. 10, 2017, 25 pages.

"Final Office Action", U.S. Appl. No. 14/580,072, Jun. 16, 2017, 35 pages.

"Final Office Action", U.S. Appl. No. 14/270,244, Jul. 14, 2017, 37 pages.

"First Action Interview Office Action", U.S. Appl. No. 14/580,072, Jan. 27, 2017, 4 pages.

"First Action Interview Office Action", U.S. Appl. No. 14/569,197, Jun. 1, 2017, 4 pages.

"First Action Interview Office Action", U.S. Appl. No. 14/568,187, Mar. 13, 2017, 5 pages.

"First Action Interview Office Action", U.S. Appl. No. 14/675,241, May 23, 2018, 5 pages.

"Foreign Notice of Allowance", KR Application No. 2017-7031568, Oct. 29, 2019, 6 pages.

"Foreign Office Action", KR Application No. 2017-7031568, Apr. 28, 2019, 11 pages.

"Foreign Office Action", KR Application No. 2020-7002628, Feb. 19, 2020, 9 pages.

"International Preliminary Report on Patentability", Application No. PCT/US2015/067106, Jul. 6, 2017, 15 pages.

"International Preliminary Report on Patentability", Application No. PCT/US2016/024659, Oct. 12, 2017, 8 pages.

"International Preliminary Report on Patentability", Application No. PCT/US2015/067044, Jul. 6, 2017, 9 pages.

"International Search Report and Written Opinion", Application No. PCT/US2015/067106, Jul. 5, 2016, 16 pages.

"International Search Report and Written Opinion", Application No. PCT/US2015/067009, Feb. 26, 2016, 8 pages.

"International Search Report and Written Opinion", Application No. PCT/US2016/024659, Jun. 10, 2016, 8 pages.

"International Search Report and Written Opinion", Application No. PCT/US2015/067044, Mar. 11, 2016, 9 pages.

"Kinect Sensor", Retrieved from <https://msdn.microsoft.com/en-us/library/hh438998.aspx> on Apr. 20, 2018, First Action Interview Pre-Interview Communication, 2012, 5 pages.

"Non-Final Office Action", U.S. Appl. No. 15/182,267, Sep. 12, 2016, 10 pages.

"Non-Final Office Action", U.S. Appl. No. 14/556,677, May 18, 2017, 12 pages.

"Non-Final Office Action", U.S. Appl. No. 13/722,818, Sep. 12, 2014, 16 pages.

(56) References Cited

OTHER PUBLICATIONS

"Non-Final Office Action", U.S. Appl. No. 13/722,818, Dec. 17, 2015, 21 pages.
"Non-Final Office Action", U.S. Appl. No. 13/722,818, Mar. 24, 2014, 22 pages.
"Non-Final Office Action", U.S. Appl. No. 14/568,251, Jun. 2, 2017, 24 pages.
"Non-Final Office Action", U.S. Appl. No. 14/578,414, Mar. 9, 2017, 26 pages.
"Non-Final Office Action", U.S. Appl. No. 14/449,120, Feb. 8, 2017, 32 pages.
"Non-Final Office Action", U.S. Appl. No. 14/270,244, Jan. 12, 2017, 35 pages.
"Non-Final Office Action", U.S. Appl. No. 14/579,936, Mar. 24, 2017, 36 pages.
"Non-Final Office Action", U.S. Appl. No. 14/530,636, Nov. 5, 2015, 6 pages.
"Notice of Allowance", U.S. Appl. No. 14/675,241, Jan. 18, 2019, 16 pages.
"Notice of Allowance", U.S. Appl. No. 14/530,636, Mar. 28, 2016, 8 pages.
"Placing An Image Inside of Another With Photoshop CS6", Retrieved at: https://web.archive.org/web/20140909091905/http://www.photoshopessentials.com/photoeffects/placing-an-image-insideanother-with-photoshop-cs6/ on Sep. 9, 2014, 6 pages.
"Pre-Interview Communication", U.S. Appl. No. 14/675,241, Apr. 11, 2018, 6 pages.
"Preinterview First Office Action", U.S. Appl. No. 14/568,187, Oct. 6, 2016, 4 pages.
"Preinterview First Office Action", U.S. Appl. No. 14/569,197, Oct. 11, 2016, 4 pages.
"Preinterview First Office Action", U.S. Appl. No. 14/580,072, Oct. 12, 2016, 5 pages.
"Preliminary Amendment", U.S. Appl. No. 14/474,003, Oct. 3, 2014, 3 pages.
"Preliminary Amendment", U.S. Appl. No. 15/182,267, Jul. 14, 2016, 7 pages.
"Response to Examiner Interview Summary", U.S. Appl. No. 14/675,241, Oct. 25, 2018, 9 pages.
"Response to Final Office Action", U.S. Appl. No. 14/675,241, Sep. 25, 2018, 15 pages.
"Response to Final Office Action", U.S. Appl. No. 13/722,818, Oct. 15, 2015, 15 pages.
"Response to Final Office Action", U.S. Appl. No. 15/182,267, Apr. 25, 2017, 9 pages.
"Response to First Action Interview OA", U.S. Appl. No. 14/580,072, Mar. 27, 2017, 11 pages.
"Response to First Action Interview OA", U.S. Appl. No. 14/568,187, May 15, 2017, 11 pages.
"Response to First Action Interview OA", U.S. Appl. No. 14/569,197, Oct. 31, 2016, 3 pages.
"Response to First Acton Interview Office Action", U.S. Appl. No. 14/675,241, Jul. 9, 2018, 14 pages.
"Response to Foreign Office Action", KR Application No. 2017-7031568, Jun. 26, 2019, 23 pages.
"Response to Non-Final Office Action", U.S. Appl. No. 14/270,244, Apr. 4, 2017, 12 pages.
"Response to Non-Final Office Action", U.S. Appl. No. 14/449,120, Apr. 19, 2017, 13 pages.
"Response to Non-Final Office Action", U.S. Appl. No. 13/722,818, Aug. 25, 2014, 14 pages.
"Response to Non-Final Office Action", U.S. Appl. No. 14/578,414, May 31, 2017, 17 pages.
"Response to Non-Final Office Action", U.S. Appl. No. 13/722,818, Jun. 17, 2016, 17 pages.
"Response to Non-Final Office Action", U.S. Appl. No. 14/579,936, May 31, 2017, 19 pages.
"Response to Non-Final Office Action", U.S. Appl. No. 13/722,818, Feb. 12, 2015, 25 pages.
"Response to Non-Final Office Action", U.S. Appl. No. 15/182,267, Feb. 13, 2017, 8 pages.
"Response to Non-Final Office Action", U.S. Appl. No. 14/530,636, Mar. 7, 2016, 8 pages.
"Response to Pre-Interview OA", U.S. Appl. No. 14/568,187, Oct. 31, 2016, 3 pages.
"Response to Pre-Interview Office Action", U.S. Appl. No. 14/675,241, Apr. 26, 2018, 5 pages.
"Response to Restriction Requirement", U.S. Appl. No. 14/675,241, Nov. 17, 2017, 6 pages.
"Restriction Requirement", U.S. Appl. No. 14/675,241, Sep. 26, 2017, 6 pages.
"Styku Startup Revolutionizes Apparel Shopping, Reduces Returns with Virtual Fitting Room", Microsoft Case Study: Microsoft Kinect for Windows—Styku, [Online]. Retrieved at: <URL: http://www.microsoft.com/casestudies/Microsoft-Kinect-for- Windows/Styku/Startup-Revolutionizes-Apparei-Shopping-Reduces-Returns-with-Virtual- Fitting-Roo . . . >,, Nov. 16, 2012, 7 pages.
"Virtual Dressing Room", YouTube, [Online]. Retrieved from the Internet: <URL: https://www.youtube.com/watch?v=UhOzN2z3wtI>,, Sep. 3, 2012.
10-2020-7002628, , "Office Action Received for Korean Patent Application No. 10-2020-7002628, mailed on Feb. 19, 2020", Feb. 19, 2020, 9 Pages.
10-2020-7002628, , "Office Action received for Korean Patent Application No. 10-2020-7002628, mailed on Dec. 2, 2020, 12 pages. (6 pages of official copy and 6 pages of english translation)", Dec. 2, 2020, 12 Pages.
10-2020-7002628, , "Office Action received for Korean Patent Application No. 10-2020-7002628 mailed on Jun. 17, 2021", Jun. 7, 2021, 13 Pages.
10-2022-7002918, , "Notice of Allowance Received for Korean Patent Application No. 10-2022-7002918, mailed on Feb. 16, 2022", Feb. 16, 2022, 6 Pages.
U.S. Appl. No. 16/392,093, , "Final Office Action Received for U.S. Appl. No. 16/392,093, mailed on Jan. 26, 2021", Jan. 26, 2021, 20 Pages.
U.S. Appl. No. 16/392,093, , "Non Final Office Action Received for U.S. Appl. No. 16/392,093, mailed on Oct. 27, 2020", Oct. 27, 2020, 15 Pages.
U.S. Appl. No. 16/392,093, , "Notice of Allowance Received for U.S. Appl. No. 16/392,093, mailed on May 14, 2021", May 14, 2021, 15 Pages.
U.S. Appl. No. 17/353,410, , "Non-Final Office Action", U.S. Appl. No. 17/353,410, Nov. 25, 2022, 16 pages.
U.S. Appl. No. 17/353,410, , "Notice of Allowance", U.S. Appl. No. 17/353,410, Feb. 22, 2023, 8 pages.
201680019472.9, , "Decision of Rejection Received for Chinese Patent Application No. 201680019472.9, mailed on Feb. 17, 2022", Feb. 17, 2022, 11 Pages.
201680019472.9, , "Office Action received for Chinese Patent Application No. 201680019472.9 mailed on Dec. 8, 2020", Dec. 8, 2020, 16 Pages.
201680019472.9, , "Office Action received for Chinese Patent Application No. 201680019472.9 mailed on Nov. 22, 2021", Nov. 22, 2021, 13 Pages.
201680019472.9, , "Office Action received for Chinese Patent Application No. 201680019472.9 , mailed on Aug. 26, 2021", Aug. 26, 2021, 14 Pages.
Basenese, Louis , "Virtual Fitting Rooms . . . Coming to a Store Near You", Retrieved at: https://www.wallstreetdaily.com/2011/07/07/virtual-fitting-rooms-fits-me/, Jul. 7, 2011, 3 pages.
Binkley, Christina , "The Goal: a Perfect First-Time Fit: True Fit Is Online Retailers' Latest Attempt to Help Consumers Buy Right Size; No Tape Measures", Retrieved at: https://www.wsj.com/articles/SB10001424052702304724404577293593210807790, Mar. 23, 2012, 4 pages.
Bossard, Lukas , "Apparel classification with style", Proceedings ACCV 2012, Nov. 5, 2012, 14 pages.
Bryant, Martin , "Fits.me launches robot to help women size up clothes online", Retrieved at: https://thenextweb.com/eu/2011/06/10/fits-me-launches-robot-to-help-women-size-up-clothes-online/, Jun. 10, 2011, 4 pages.

(56) References Cited

OTHER PUBLICATIONS

Chang, Andrea, "Virtual Fitting Rooms Changing the Clothes Shopping Experience", Retrieved at: http://articles.latimes.com/2012/jul/13/business/la-fi-virtual-dressing-room-20120714, Jul. 13, 2012, 2 pages.

Cheng, Ching-I et al., "A 3D Virtual Show Room for Online Apparel Retail Shop", Proceedings: APSIPA ASC 2009: Asia-Pacific Signal and Information Processing Association, 2009, Annual Summit and Conference,, Oct. 2009, pp. 193-199.

Criminisi, A., "Single View Metrology", Int. J. Comput. Vision 40, Nov. 2000, 8 pages.

Fong, et al., "Gesture Recognition from Data Streams of Human Motion Sensor Using Accelerated PSO Swarm Search Feature Selection Algorithm", "Hindawi Publishing Corp., Journal of Sensors, vol. 2015, Article ID 205707", Mar. 30, 2015, 17 Pages.

Fuhrmann, Arnulph et al., "Interaction-free dressing of virtual humans", Computers & Graphics 27, No. 1, (2003),, 2001, pp. 71-82.

Gioberto, Guido et al., "Garment-Integrated Wearable Sensing for Knee Joint Monitoring", Proceedings of the 2014 ACM International Symposium on Wearable Computers: Adjunct Program, Sep. 13, 2014, 6 pages.

Gioberto, Guido et al., "Overlock-Stitched Stretch Sensors: Characterization and Effect of Fabric Property", Journal of Textile and Apparel, Technology and Management, vol. 8, Issue 3, (Winter 2013),, Dec. 2013, 14 pages.

Hughes, Christopher et al., "Physical Simulation for Animation and Visual Effects: Parallelization and Characterization for Chip Multiprocessors", In ACM SIGARCH Computer Architecture News, vol. 35, No. 2, (2007), Jun. 9, 2007, 12 pages.

Jojic, Nebojsa et al., "A Framework for Garment Shopping over the Internet", Handbook on Electronic Commerce, 2000, 22 pages.

Karsch, Kevin et al., "Rendering Synthetic Objects into Legacy Photographs", Cornell University arXiv, arXiv.org [retrieved Dec. 9, 2021]. Retrieved from the Internet <https://arxiv.org/pdf/1912.11565.pdf>., Dec. 1, 2011, 12 pages.

Kristensen, Kasper et al., "Towards a Next Generation Universally Accesible 'Online Shopping-for-Apparel' System", Human-Computer Interaction, Part III, HCII 2013, LNCS 8006, (2013), Jul. 21, 2013, 11 pages.

Li, Hongqiang et al., "Wearable Sensors in Intelligent Clothing for Measuring Human Body Temperature Based on Optical Fiber Bragg Grating", Optics Express, vol. 20 (11), [Online]. Retrieved from the Internet: <URL: htp://ro.uow.edu.au/eispapers/298>,, 050/9/2012, 13 Pages.

Lim, Sukhwan, "Characterization of noise in digital photographs for image processing", In Electronic Imaging 2006, International Society for Optics and Photonics, Oct. 21, 2008, 10 pages.

Luo, Ze Gang et al., "Reactive 2D/3D garment pattern design modification", Computer-Aided Design 37, No. 6, (2005), 2005, pp. 623-630.

Mcwhertor, Michael, "What's Inside A Kinect?", Retrieved from <https://kotaku.com/5682075/whats-inside-a-kinect> on Apr. 20, 2018, Nov. 4, 2010, 3 pages.

O'Brien, Terrence, "Fits.me—Imitates Ladies of All Shapes and Sixes, Tries Clothes on for you (", [Online]. Retrieved from the Internet: <URL: http://www. eng adget.com/20 11 /06/13/fits-me-im itates-lad ies-of-all-shapes-a nd-sizes-triesclothes- of>,—on Aug. 13, 2014, 10 pages.

Okreylos, , "3D Video Capture with Three Kinects", YouTube, [Online]. Retrieved from the Internet: <URL: https://www.youtube.com/watch?v=Ghgbycqb92c>, (May 13, 2014), 5 minutes, 35 seconds.

PCT/US2015/067044, , "International Preliminary Report on Patentability received for PCT Patent Application No. PCT/US2015/067044, mailed on Jul. 6, 2017", Jul. 6, 2017, 9 Pages.

Rudolph, Larry et al., "A Simple Load Balancing Scheme for Task Allocation in Parallel Machines", ACM, (1991), Jun. 1991, 9 pages.

Satish, N et al., "Can traditional programming bridge the Ninja performance gap for parallel computing applications?", 39th AnnuaiiSCA, [Online]. Retrieved from the Internet: <URL: http://ieeexplore. ieee.org/xpl/articleDetails.jsp?reload=true&arnumber=6237038>,, 2012, 3 pages.

Selle, Andrew et al., "Robust High-Resolution Cloth Using Parallelism, History-Based Collisions and Accurate Friction", IEEE Transactions on Visualization and Computer Graphics, vol. 15, No. 2, Mar. 2009, 12 pages.

Yang, Shan et al., "Detailed Garment Recovery from a Single-View Image", Sep. 12, 20116, 13 pages.

\* cited by examiner

MODIFICATION OF THREE-DIMENSIONAL GARMENTS USING GESTURES

RELATED APPLICATION

This application is a continuation of and claims priority to U.S. patent application Ser. No. 17/353,410 filed Jun. 21, 2021, which is a continuation of and claims priority to U.S. patent application Ser. No. 16/392,093 filed Apr. 23, 2019, which is a continuation of and claims priority to U.S. patent application Ser. No. 14/675,241 filed Mar. 31, 2015. The disclosures of these applications are incorporated by reference herein in their entirety.

TECHNICAL FIELD

The present application relates generally to the technical field of data processing, specifically, three-dimensional (3D) modeling and simulation.

BACKGROUND

Shopping for clothes in physical stores can be an arduous task and, due to travelling and parking, can be very time consuming. With the advent of online shopping, consumers can purchase clothing, while staying home, via a computer or any other electronic device connected to the Internet. Additionally, purchasing clothes online can be different in comparison with purchasing clothes in a store. One difference is the lack of a physical dressing room to determine if and how an article of clothing fits the particular consumer. Since different consumers can have different dimensions, seeing how an article of clothing fits, by use of a dressing room, can be a very important aspect of a successful and satisfying shopping experience.

DESCRIPTION OF EMBODIMENTS

Figure 1:
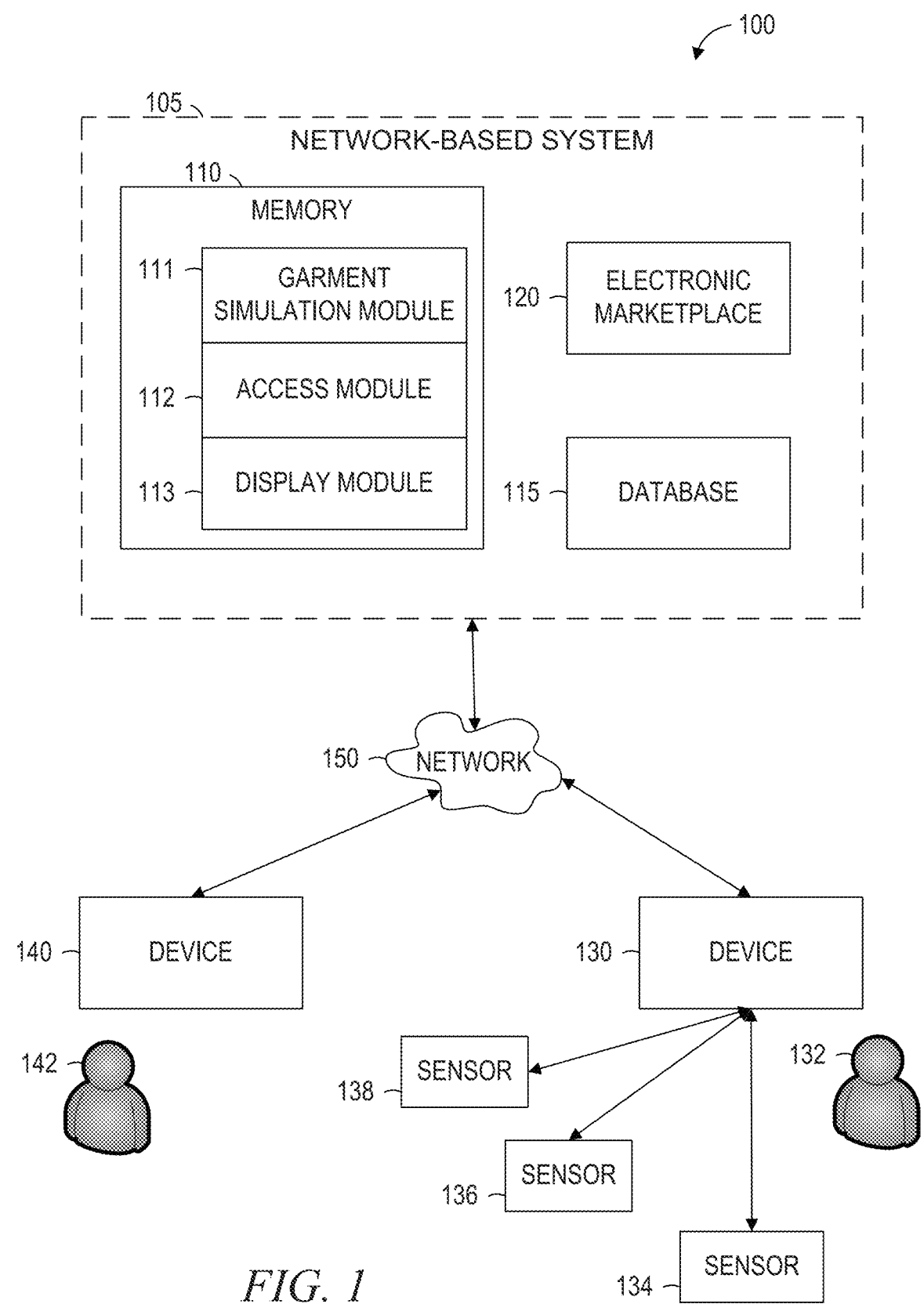
FIG. 1 is a schematic diagram illustrating an example system for generating and modifying a 3D garment model, in accordance with certain example embodiments.

Example systems and methods are directed to modifying (e.g., tailoring) garments in a virtual fitting room based a gesture from a user. Provision of a virtual fitting room can include recognition of a gesture representing a command to initiate an action on behalf of a user. Examples merely illustrate possible variations. Unless explicitly stated otherwise, components and functions are optional and can be combined or subdivided, and operations can vary in sequence or be combined or subdivided. In the following description, for purposes of explanation, numerous specific details are set forth to provide a thorough understanding of example embodiments. It will be evident to one skilled in the art, however, that the present subject matter can be practiced without these specific details.

According to some embodiments, a system can display (e.g., on an augmented reality headset, virtual reality headset, television screen, computer screen, or mobile device screen) a representation of a garment (hereinafter "three-dimensional (3D) garment model") draped on a representation of a user (hereinafter "avatar"). The 3D garment draped (e.g., mapped) on the avatar can allow the user to virtually try on a garment available for sale in a virtual dressing room. The garment can also include other items that are related to clothing, such as footwear, purses, jewelry, or accessories.

One example of such action is a system that allows a user to purchase garments using an electronic marketplace. For example, the user finds a garment in the electronic marketplace and adds the garment in a virtual dressing room. Then, using sensors, the system can generate an avatar corresponding to the user. Additionally, a 3D garment model corresponding to the garment is accessed and draped on the avatar. The 3D garment model draped on a mirrored self of the user (e.g., avatar) can be presented to the augmented reality or virtual reality goggles worn by the user. The user can adjust the size of the garment using a modification gesture. The modification gesture is captured by the sensors and determined by the system. For example, the user can try a larger size of the garment by using a pinching and pulling gesture. Subsequently, the user can accept the larger-sized garment using a confirmation gesture. Alternatively, the garment can be custom-tailored (e.g., the sleeves shortened) by the user using modification gestures.

In some instances, the 3D garment model is representative of real clothing available for purchase using an electronic marketplace. For example, the user can virtually try on the garment available for sale while the user is in his home (e.g., using a virtual reality headset), or in front of a store (e.g., using a virtual store front).

In various example embodiments, the system can generate an avatar based on a first and second set of sensor data accessed from a first sensor and second sensor. In some instances, the avatar can be further generated based on a third set of sensor data accessed from a third sensor. Additionally, the system can drape the 3D garment model on the avatar. The system can also determine a gesture performed by the user, and that the gesture represents a command to initiate an action to modify the 3D garment model. Examples of such actions that correspond to user gestures include a pinching and pulling gesture, a pinching and tucking gesture, a hand stretching gesture, a hand pinching gesture, a hand nipping gesture, and so on.

By way of examples, the pinching gesture can be the finger motion of bringing two fingers together. The stretching gesture can be the finger motion of bringing two fingers apart. The pulling gesture can be the hand motion of pulling a garment section to elongate the garment section. For example, the pinching and pulling gesture is the combination of the pinching gesture and the pulling gesture, which can be bringing the two fingers together, then pulling a section of the garment using a hand motion to elongate it. The tucking gesture can include tucking in one or more fingers, or tucking the whole hand inside a part of the garment so that the hand is not visible. The hand nipping gesture includes using a hand to squeeze a part of the body. In some instances, one or more of these gestures can be combined using one or both hands.

In some example embodiments, the system can prompt the user to confirm that the gesture represents the command (e.g., the user intended to issue the command when making the gesture). Based on the user confirming that the gesture represents the command, the system can modify (e.g., tailor) the 3D garment on behalf of the user. Examples of a confirmation gesture include repeating the gesture, making a general gesture associated with confirmation (e.g., an "okay" gesture by connecting the thumb and forefinger in a circle and holding the other fingers straight), or issuing a voice command.

In various example embodiments, the user can employ a particular gesture to change the color, pattern, or texture of a representation of the garment the user is virtually trying on. In various example embodiments, the 3D garment model can include garments that the user is currently wearing. In certain example embodiments, the 3D garment model can include garments that are being offered for sale by a merchant.

In some example embodiments, the system can receive sensor data descriptive of the body of the user in a 3D physical space. The sensor data can be received from a sensor (e.g., depth sensor). The system can generate an avatar of the user based on the sensor data descriptive of the body of the user. The avatar can also include a first shape based on the sensor data received at a first time and a second shape based on the sensor data received at a second time. Then, the determining of the gesture can be performed by analyzing a difference between the first and second shapes. The system can also determine and perform an action that corresponds to the gesture.

In some example embodiments, the system, using a depth sensor, determines the user's body measurements based on positional data points determined by the system based on the sensor data captured by the depth sensor. The system can pre-filter the garments whose representations should be presented to the user such that only representations of garments matching the user's body measurements can be presented to the user. For example, if the system determines that the user wears a medium-sized shirt based on the measurements of the user's body, then the system presents medium-sized shirts to the user.

In various example embodiments, the system can use cloth physics technology to drape a 3D garment model on an avatar based on a material property of the garment. The material property can reflect the features of the fabric from which the garment was made. For example, garments made from different fabrics can hang or move differently based on the type of fabric used to manufacture the particular garment. Thus, using cloth physics technology in draping 3D garments on the avatar allows a user to see how the real physical item of clothing would move when worn by the user.

In some example embodiments, the sensor data can be used to generate (e.g., represent, model, or define) a 3D field of view that can be displayed on a screen (e.g., of an augmented reality headset, virtual reality headset, television, computer, or mobile device). Examples of such sensor data include the locations and shapes of objects in relation to the location of the sensor. In various example embodiments, based on the received sensor data, the system can determine details of the objects in the room, such as spatial measurements of the objects in the room (e.g., of the user's body or of the furniture in the room). In some example embodiments, based on the received sensor data, the system can determine gestures made by the user. Some devices (e.g., that can include a depth sensor and a camera) can detect other details of the objects in the room (e.g., texture, color, or pattern of the clothing worn by the user or of a wall of the room).

Reference will now be made in detail to various example embodiments, some of which are illustrated in the accompanying drawings. In the following detailed description, numerous specific details are set forth in order to provide a thorough understanding of the present disclosure and the described embodiments. However, the present disclosure can be practiced without these specific details.

FIG. 1 is a schematic diagram illustrating an example system for generating and modifying a 3D garment model, in accordance with certain example embodiments. The network environment 100 includes memory 110, a database 115, an electronic marketplace 120, and devices 130 and 140, all communicatively coupled to each other through a network 150.

In some example embodiments, the memory 110, or a computer-readable storage medium of the memory 110, stores the following programs, modules, and data structures, or a subset thereof: a garment simulation module 111, an access module 112, and a display module 113.

In some example embodiments, the database 115 can include an asset library to store 2D or 3D representations of body types and body measurements associated with a user, as well as 2D or 3D representations of clothing items (e.g., garments or other objects).

As shown in FIG. 1, the memory 110, the database 115, the electronic marketplace 120, some, or all of them, can form all or part of a network-based system 105. The network-based system 105 can include one or more processing units (CPUs) for executing software modules, programs, or instructions stored in the memory 110 and thereby performing processing operations; one or more communications interfaces; and one or more communication buses for interconnecting these components. The communication buses can include circuitry (e.g., a chipset) that interconnects and controls communications between system components. The network-based system 105 also optionally includes a power source and a controller coupled to the database 115. The network-based system 105 optionally includes a user interface comprising a display device and a keyboard.

Also shown in FIG. 1 are users 132 and 142. One or both of the users 132 and 142 can be a human user (e.g., a human being), a machine user (e.g., a computer configured by a software program to interact with the device 130 or device 140), or any suitable combination thereof (e.g., a human assisted by a machine or a machine supervised by a human). The user 132 is not part of the network environment 100, but is associated with the device 130 and can be the user of the device 130. For example, the device 130 can be an augmented reality headset, a virtual reality headset, a desktop computer, a vehicle computer, a tablet computer, a navigational device, a portable media device, or a smartphone belonging to the user 132. Likewise, the user 142 is not part of the network environment 100, but is associated with the device 140. As an example, the device 140 can be an augmented reality headset, a virtual reality headset, a desktop computer, a vehicle computer, a tablet computer, a navigational device, a portable media device, or a smartphone belonging to the user 142. An example of an augmented reality headset is the Microsoft HoloLens® headset. An example of a virtual reality headset is the Oculus Rift 0 headset.

Also shown in FIG. 1 are sensors 134, 136, and 138 (e.g., a Kinect™ device, a depth sensor, a smartphone, or a camera). In some instances, the sensor 134 includes a depth sensor, a red-green-blue (RGB) camera, and a microphone. The system (e.g., the network environment 100) can include one or more sensors. In some example embodiments, one or more of the sensors 134, 136, or 138 can be part of the device 130. In other example embodiments, the sensors 134, 136, or 138 can be external to the device 130. Each sensor 134, 136, and 138 can capture (e.g., receive, gather, or collect) sensor data (e.g., spatial data) about the physical space external to the sensor (e.g., spatial data about the user 132) and transmit the captured sensor data to the device 130, which in turn can transmit some or all of the sensor data captured by the sensor 134, 136, or 138 to the garment simulation module 111 via the network 150. In some example embodiments, the sensor 134, 136, or 138 can communicate with and send the captured sensor data to the garment simulation module 111 via the network 150 without first sending the sensor data to the device 130.

The network 150 can be any network that enables communication between or among machines, databases, and devices (e.g., the garment simulation module 111 and the device 130). Accordingly, the network 150 can be a wired network, a wireless network (e.g., a mobile or cellular network), or any suitable combination thereof. The network 150 can include one or more portions that constitute a private network, a public network (e.g., the Internet), or any suitable combination thereof. Accordingly, the network 150 can include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., a Wi-Fi network or a WiMAX network), or any suitable combination thereof. Any one or more portions of the network 150 can communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

The memory 110 can include high-speed random-access memory, such as dynamic random-access memory (DRAM), static random-access memory (SRAM), double data rate random-access memory (DDR RAM), or other random-access solid state memory devices. Additionally, the memory 110 can include non-volatile memory, such as one or more magnetic disk storage devices, optical disk storage devices, flash memory devices, or other non-volatile solid state storage devices. The memory 110 can optionally include one or more storage devices remotely located from the CPU. The memory 110, or alternately the non-volatile memory device within the memory 110, can be or include a non-transitory computer-readable storage medium.

The garment simulation module 111 can generate an avatar (e.g., 3D body model) based on the accessed sensor data from the sensors 134, 136, or 138. In some instances, the garment simulation module 111 can position the avatar inside a 3D garment model of a garment available for sale. Moreover, the garment simulation module 111 can calculate simulated forces acting on the 3D garment model based on the positioning of the avatar inside the 3D garment model and the material property of the garment. The garment simulation module 111 can generate an image of the 3D garment model draped on the avatar based on the sensor data or the calculated simulated forces. The simulated forces can be calculated, for example, by the garment simulation module 111, based on 3D garment tessellation techniques.

The access module 112 can communicate with devices (e.g., the device 130 or the device 140) via the one or more communications interfaces (e.g., wired or wireless), the network 150, other wide area networks, local area networks, metropolitan area networks, and so on. Additionally, the access module 112 can access information for the memory 110 via a communication bus. The access module 112 can access information stored in the database 115. Additionally, when the 3D garment models or avatar is stored in the device 130, the access module 112 can access the user's information in the device 130 via the network 150. Alternatively, when the 3D garment models or avatar is stored on a cloud server, the access module 112 can access the user's information in the cloud server via the network 150.

The display module 113 is configured to cause presentation of the generated image on a display of a device (e.g., device 130). For example, the display module 113 can present a 3D image or simulation on the display of virtual reality goggles. The 3D simulation can be based on the actions of the garment simulation module 111 and the access module 112.

Any of the machines, databases, or devices shown in FIG. 1 can be implemented in a general-purpose computer modified (e.g., configured or programmed) by software to be a special-purpose computer to perform the functions described herein for that machine, database, or device. For example, the garment simulation module 111, the access module 112, the display module 113, the database 115, the electronic marketplace 120, and the devices 130 and 140 can be implemented in a computer system, in whole or in part, as described below with respect to FIG. 8. As used herein, a "database" is a data storage resource and can store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 can be combined into a single machine, and the functions described herein for any single machine, database, or device can be subdivided among multiple machines, databases, or devices.

Figure 2:
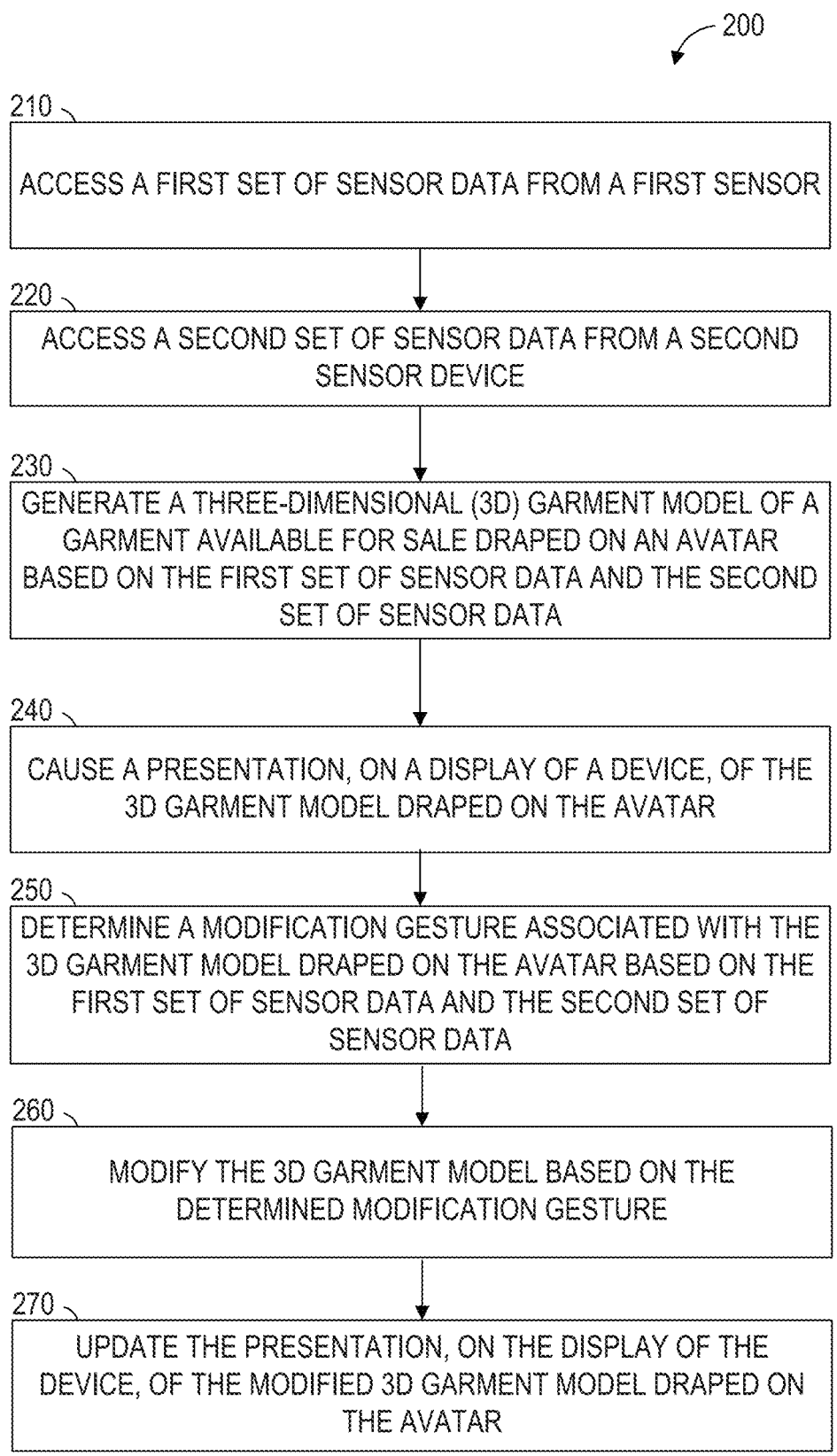
FIG. 2 is a flow diagram of a process for modifying a garment based on a gesture, in accordance with certain example embodiments.

FIG. 2 is a flowchart representing a method 200 for modifying a 3D garment based on gestures of a user, according to example embodiments. The method 200 is governed by instructions stored in a computer-readable storage medium and that are executed by one or more processors of the network-based system 105. Each of the operations shown in FIG. 2 can correspond to instructions stored in a computer memory (e.g., memory 110) or computer-readable storage medium.

Operations in the method 200 can be performed by the garment simulation module 111, the access module 112, or the display module 113. As shown in FIG. 2, the method 200 includes operations 210, 220, 230, 240, 250, 260, and 270. The garment simulation module 111 can configure a processor among the network-based system 105 to perform the operations of the method 200.

At operation 210, the access module 112 accesses a first set of sensor data from a first sensor. The first sensor is located at a first location, such as in front of the user. The first sensor can be a camera, a depth sensor, a heat sensor, a radar sensor, an acoustic sensor, and so on. The first set of sensor data can include spatial data received from the first sensor (e.g., sensor 134). The access module 112 accesses (e.g., receives) the sensor data obtained from the sensor 134. The sensor data can include spatial data about the physical space external to the sensor. In some instances, the sensor data is transmitted to the device 130, which in turn can transmit some or all of the sensor data to the network-based system 105 via the network 150. In some other instances, the sensor 134 can communicate with and send the captured sensor data to the network-based system 105 via the network 150 without first sending the sensor data to the device 130.

In some instances, the first set of sensor data includes 2D range images. A 2D range image can have pixel values corresponding to distance information for an object in relation to the first sensor, which can be located in front of the user. For example, pixel values corresponding to a blue color variation can be associated with an object farther away from the first sensor, while pixel values corresponding to red color variation can be associated with an object that is closer to the first sensor.

At operation 220, the access module 112 accesses a second set of sensor data from a second sensor. The second sensor can be a camera, a depth sensor, a heat sensor, a radar sensor, an acoustic sensor, and so on. The second sensor is located at a second location which is different than the first location. For example, the second location can be behind the user. The access module 112 accesses (e.g., receives) the sensor data obtained from the second sensor (e.g., sensor 136). In some instances, the second set of sensor data is transmitted to the device 130, which in turn can transmit some or all of the sensor data to the network-based system 105 via the network 150. In some other instances, the sensor 136 can communicate with and send the second set of sensor data to the network-based system 105 via the network 150 without first sending the sensor data to the device 130.

In some instances, the second set of sensor data includes 2D range images having pixel values corresponding to distance information for an object in relation to the second sensor. The second sensor can be located behind the user. Alternatively, when three sensors are used, the sensors can be located in a triangular perimeter around the user. An implementation with three sensors can include a first sensor located in front of the user (e.g., 12 o'clock position of a 12-hour clock), a sensor located behind and to the right of the user (e.g., 4 o'clock position of a 12-hour clock), and the third sensor located behind and the left of the user (e.g., 8 o'clock position of a 12-hour clock).

In some instances, the accessing of the first set of sensor data from the first sensor is performed by a wireless transceiver.

Figure 4:
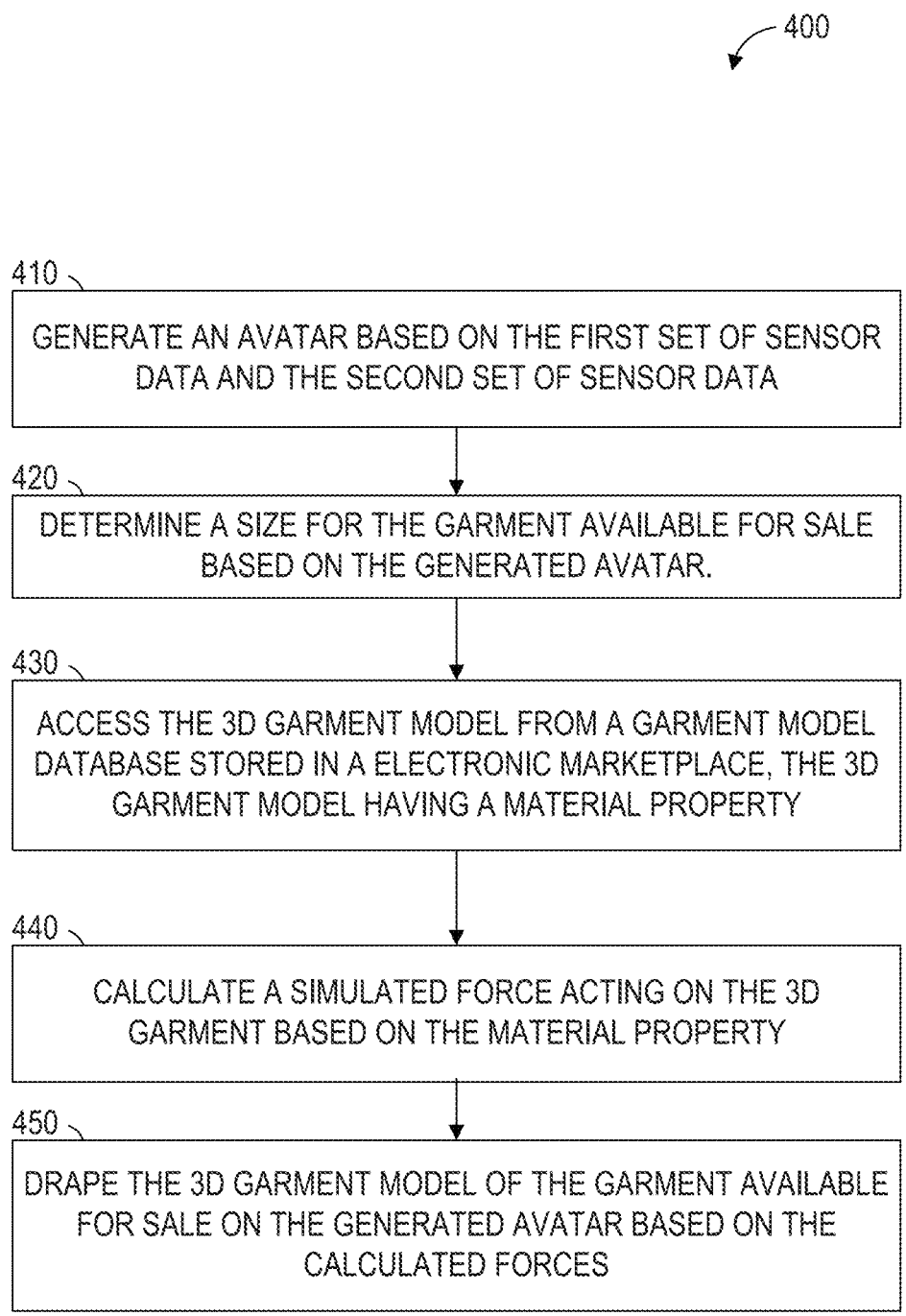
FIG. 4 is a flow diagram of a process for draping a 3D garment model on an avatar, in accordance with certain example embodiments.

At operation 230, the garment simulation module 111 generates a 3D garment model of a garment available for sale draped on an avatar. The 3D garment model and the avatar are generated based on the first set of sensor data and the second set of sensor data. FIG. 4 further describes techniques for generating the avatar and the 3D garment model based on the first and second sets of sensor data.

In some instances, the avatar can be generated by stitching a 2D representation of the front of a body profile together with a 2D representation of the back of the body profile. Then the 3D garment model is draped on the avatar based on calculated simulated forces.

Additionally, the 3D garment model can be a tessellated 3D garment model. The tessellated 3D garment model can include a group of vertices associated with points on the surface of the garment. The garment points can be generated using a tessellation technique. For example, a shirt can be tessellated with triangles (e.g., about 20,000 triangles when a triangle edge is around 1 centimeter), and the vertices of the triangles can be the garment points of the 3D garment model. The garment points can include location information such as an x, y, and z position value. The simulated forces which are discussed in FIG. 4 (e.g., at operation 440) can be calculated for each garment point. U.S. Non-Provisional application Ser. No. 14/270,244 filed on May 5, 2014, which is incorporated herein by reference, describes techniques for generating a tessellated 3-D garment model.

The garment simulation module 111 can position at least a portion of the avatar inside the garment points. In some instances, positioning can include placing the garment model on or around the avatar. In these instances, the garment model can be stretched and deformed based on the simulation. As previously mentioned, the garment model can consist of a set of shapes (e.g., triangles) to form the surface of the garment model. The shapes can be created using lines connecting the vertices. Additionally, the garment model can include physical properties associated with the lines (e.g., edges) and vertices in the tessellated 3D garment model.

The garment simulation module 111 can simulate the garment model on the generated user avatar. In some instances, simulation of the garment can include placing the garment around the avatar at an appropriate position, and running simulations. The simulation can advance the position and other related variables of the vertices of the garment model based on different criteria (e.g., the laws of physics, garment material properties, body-garment interaction). The result is a large system of equations (e.g., one variable for each force component) that the garment simulation module 111 can solve in an iterative fashion. The simulation can be completed when the simulation becomes stable. For example, the simulation can become stable when the garment model reaches a steady state with a net force of zero. The U.S. Non-Provisional application Ser. No. 14/270,244 filed on May 5, 2014, which has been previously incorporated herein by reference, describes techniques for the garment simulation module 111 to simulate the garment model on the generated user avatar using a large system of equations.

At operation 240, the display module 113 causes a presentation, on a display of a device, of the 3D garment model draped on the avatar. In some instances, the device can be a virtual reality headset. Additionally, the device can be the device 130 or the device 140. Furthermore, the avatar can correspond to a body model of the user 132, and the 3D garment draped on the avatar can be presented to either the user 132 or the user 142.

In addition to presenting the 3D garment model draped on the avatar, the sensor data can be used to generate a 3D field of view that can be displayed on the display of the device. In various example embodiments, based on the received sensor data, the system can determine details of the objects in the room, such as spatial measurements of the objects in the room (e.g., of the furniture in the room).

In some instances, the generating of the 3D garment model draped on the avatar is performed by a graphics processing unit.

Figure 5:
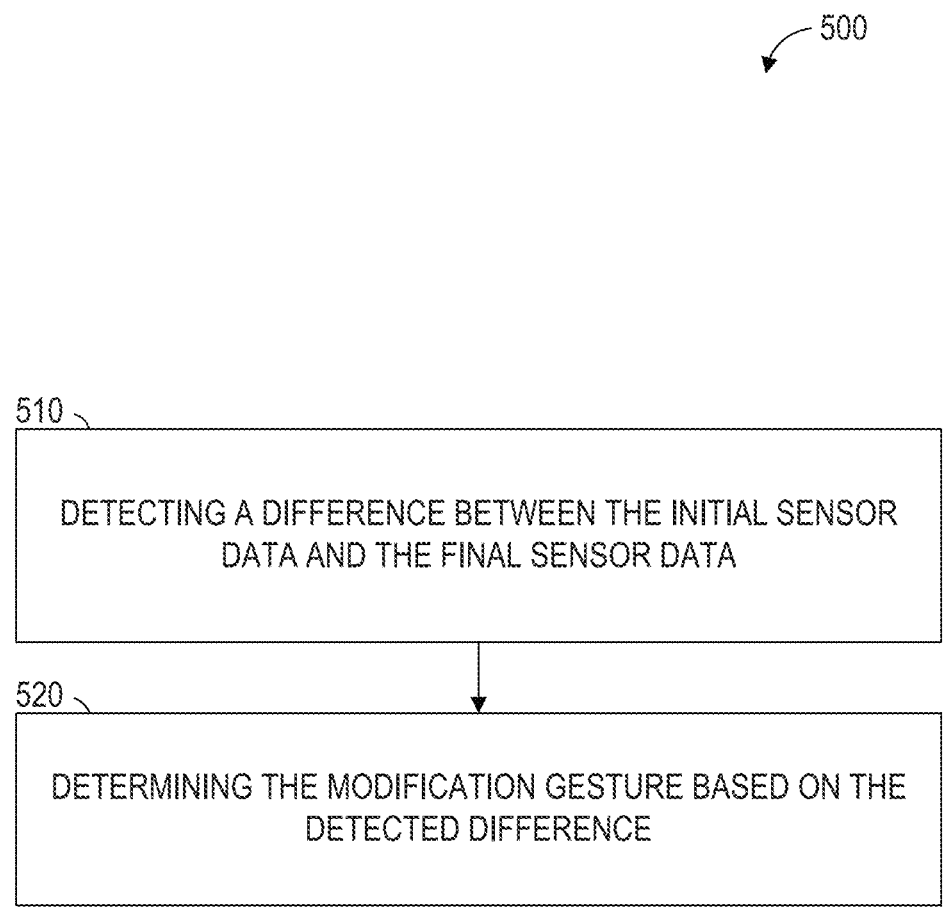
FIG. 5 is a flow diagram of a process for determining a modification gesture based on sensor data, in accordance with certain example embodiments.

At operation 250, the garment simulation module 111 determines a modification gesture associated with the 3D garment model draped on the avatar based on the first set of sensor data and the second set of sensor data. The modification can include modifying the existing garment that is draped on the avatar, such as altering the garment based on the modification gesture. In some instances, the modification gesture is confined to the existing garment. FIG. 5 further describes techniques for determining the modification gesture.

For example, the garment simulation module 111 determines that the avatar has a first shape based on the sensor data received at a first time. Additionally, the garment simulation module 111 determines a second shape for the avatar based on the sensor data received at a second time, which occurs after the first time. Then, the determining of the gesture can be performed by analyzing a difference between the first and second shapes. By analyzing the difference between the first and second shapes, the garment simulation module 111 determines the modification gesture performed by the user, and that the modification gesture represents a command to initiate an action to modify the 3D garment model. Examples of such actions that correspond to user gestures include a pinching and pulling gesture, a pinching and tucking gesture, a hand stretching gesture, a hand pinching gesture, a hand nipping gesture, and so on. By way of examples, the pinching gesture can be the finger motion of bringing two fingers together. The stretching gesture can be the finger motion of bringing two fingers apart. The pulling gesture can be the hand motion of pulling a garment section to elongate the garment section. For example, the pinching and pulling gesture is the combination of the pinching gesture and the pulling gesture, which can be bringing the two fingers together, then pulling a section of the garment using a hand motion to elongate it. The tucking gesture can include tucking in one or more fingers, or tucking the whole hand inside a part of the garment so that the hand is not visible. The hand nipping gesture includes using a hand to squeeze a part of the body. In some instances, one or more of these gestures can be combined using one or both hands.

At operation 260, the garment simulation module 111 modifies the 3D garment model based on the determined modification gesture. For example, based on the modification gesture, a section of the garment model (e.g., sleeve length, leg length, waist size, neck size) can be shortened, reduced, enlarged, or lengthened. Additionally, the fit of the garment (e.g., altering a shirt) can be changed based on the modification gesture.

At operation 270, the display module 113 updates the presentation, on the display of the device, of the modified 3D garment model draped on the avatar.

In some instances, the method 200 can further include accessing a third set of sensor data from a third sensor. The first sensor, the second sensor, and the third sensor are positioned in a triangle configuration, such as an equilateral triangle configuration. Additionally, the generating of the 3D garment model draped on the avatar at operation 230 is further based on the third set of sensor data. Furthermore, the determining of the modification gesture at operation 250 is further based on the third set of sensor data.

In some instances, the garment simulation module 111 can prompt the user to confirm that the gesture represents the command (e.g., the user intended to issue the command when making the gesture). Based on the user confirming that the gesture represents the command, the system can modify (e.g., tailor) the 3D garment on behalf of the user.

Figure 3:
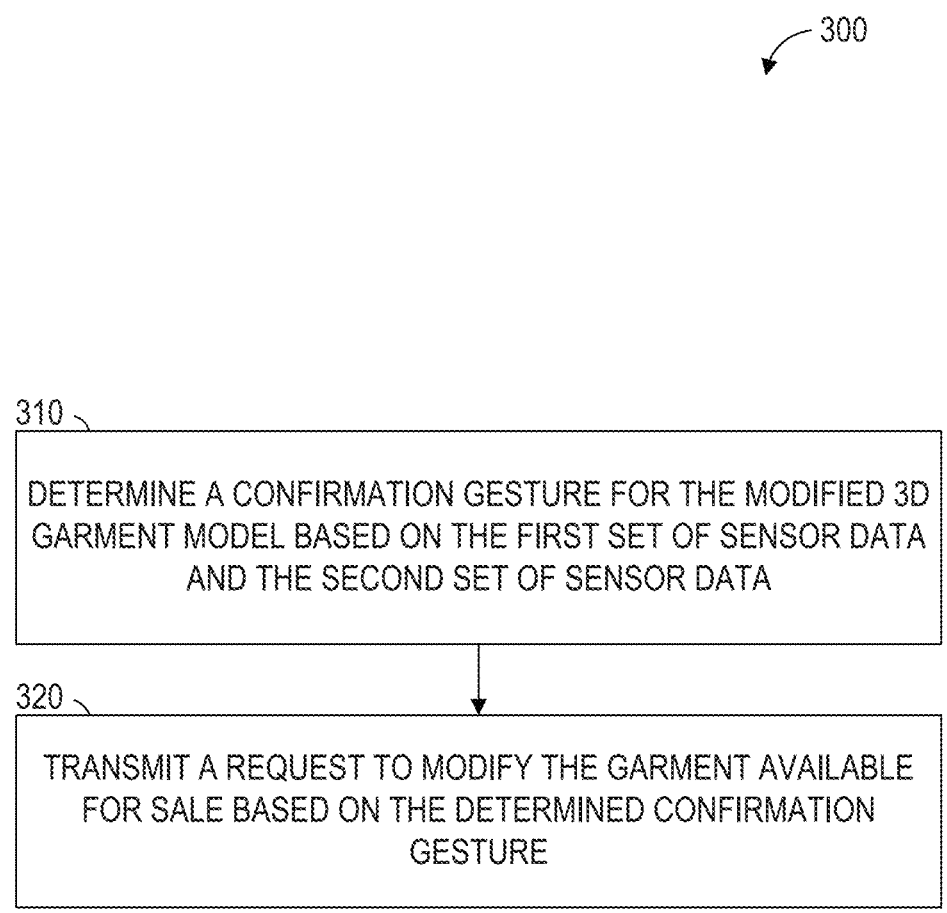
FIG. 3 is a flow diagram of a process for transmitting a modification request based on a confirmation gesture, in accordance with certain example embodiments.

FIG. 3 is a flowchart representing a method 300 for confirming a modification of a garment (e.g., physical garment), according to example embodiments. The method 300 is governed by instructions stored in a computer-readable storage medium and that are executed by one or more processors of the network-based system 105. Each of the operations shown in FIG. 3 can correspond to instructions stored in a computer memory (e.g., memory 110) or computer-readable storage medium. Operations in the method 300 can be performed by the garment simulation module 111, the access module 112, or the display module 113. As shown in FIG. 3, the method 300 includes operations 310 and 320.

At operation 310, the garment simulation module 111 determines a confirmation gesture for the 3D garment model modified at operation 260. The confirmation gesture is based on the first set of sensor data and the second set of sensor data. The confirmation gesture can be determined using similar techniques to those later described by method 500.

For example, continuing with the example described at operation 250, the garment simulation module 111 can determine that the avatar has a third shape based on the sensor data received at a third time. Additionally, the garment simulation module 111 determines a fourth shape for the avatar based on the sensor data received at a fourth time, the fourth time being after the third time.

For example, the first shape is of the user standing still in front of the sensors. The second shape can be associated with the user performing the hand modification gesture. The third shape can once again be the user standing still in front of the sensors. The fourth shape can be associated with the user performing the hand confirmation gesture.

The determining of the confirmation gesture can be performed by analyzing a difference between the third and fourth shapes. By analyzing the difference between the third and fourth shapes, the garment simulation module 111 determines the confirmation gesture performed by the user.

Examples of a confirmation gesture include repeating the modification gesture, making a general gesture associated with confirmation (e.g., "okay" gesture by connecting the thumb and forefinger in a circle and holding the other fingers straight), or issuing a voice command.

At operation 320, the garment simulation module 111 transmits a request to modify the garment available for sale based on the confirmation gesture determined at operation 310. For example, the request is transmitted to the electronic marketplace 120 to modify (e.g., tailor) the garment based on the modification gesture received by the user.

In some instances, the garment simulation module 111 sends custom sizing information to a manufacturer when the manufacturer-predefined sizes do not fit the customer correctly. Subsequently, the garment simulation module 111 can request the manufacturer to open a custom order for the customer.

FIGS. 4 and 5 further describe techniques initially described in FIG. 2, according to example embodiments. FIG. 4 is a flowchart further describing operation 230 of FIG. 2. FIG. 5 is a flowchart further describing operation 250 of FIG. 2.

FIG. 4 is a flowchart describing a method 400 for generating the 3D garment draped on the avatar based on the first and second sets of sensor data, according to example embodiments. The method 400 is governed by instructions stored in a computer-readable storage medium and that are executed by one or more processors of the network-based system 105. Each of the operations shown in FIG. 4 can correspond to instructions stored in a computer memory (e.g., memory 110) or computer-readable storage medium. Operations in the method 400 can be performed by the garment simulation module 111, the access module 112, or the display module 113. As shown in FIG. 4, the method 400 includes operations 410, 420, 430, 440 and 450.

At operation 410, the garment simulation module 111 generates an avatar based on the first set of sensor data and the second set of sensor data. As previously mentioned, the first set of sensor data and the second set of sensor data are accessed at operations 210 and 220. The garment simulation module 111 accesses sensor data descriptive of the body of the user (e.g., waist size, chest size, height, arm length, leg length) in a 3D physical space. The sensor data can be received from a sensor. The garment simulation module 111 generates the avatar of the user based on the sensor data descriptive of the body of the user.

In some instances, in order to reduce the rendering or processing time, the garment simulation module 111 can generate an avatar for the user based on a body profile. For example, based on the sensor data, data descriptive of the body of the user (e.g., waist size, chest size, height, arm length, leg length) can be measured. Then, the avatar can be generated based on the measured body parameters. Additionally, when the body profile includes a plurality of computed measurements (e.g., waistband size, high hip, low hip, thigh, knee, an inseam length, a fit, a cut), the generated avatar becomes a more accurate representation of the user.

At operation 420, the garment simulation module 111 determines a size for the garment available for sale based on the generated avatar. For example, the garment simulation module 111 using the accessed sensor data can determine positional data points. Additionally, the garment simulation module 111 determines the user's body measurements based on positional data points.

In some instances, the garment simulation module 111 can be configured to determine a size from a set of sizes for the garment based on the simulated forces which are described later at operation 440. For example, the garment simulation module 111 can initially recommend a size, and then calculate simulated forces based on the initial recommendation, and update the size recommendation based on the calculated simulated forces in an iterative process. Accordingly, the display module 113 can present the garment model with a recommended size to the user. Furthermore, the garment simulation module 111 can determine a recommended size based on the available garment sizes stored in the database 115 or the electronic marketplace 120.

Techniques for recommending a size from the given set of sizes for a garment are provided, in accordance with example embodiments. For example, tops are usually distributed in a few generic sizes (e.g., XS, S, M, L, XL, XXL). By computing the calculated forces for each size for the user's avatar, the garment simulation module 111 can suggest a recommended size. The recommended size can be based on the size that best fits the avatar's dimensions, or the recommendation could be based on the garment fit guidance from a manufacturer, designer, or stylist.

At operation 430, the garment simulation module 111 accesses the 3D garment model. The 3D garment model can be stored in a garment model database stored in an electronic marketplace. For example, the electronic marketplace can maintain a database of garments available for sale. Additionally, the 3D garment model can include metadata information, such as a material property of the garment (e.g., elasticity, stiffness, fabric of garment, weight), price information, available quantity information, size information, fitting features (e.g., based on manufacturer), and so on. In some instances, the garment simulation module 111 pre-filters the garments to be presented to the user such that only 3D garment models matching the body measurements are presented to the user. For example, if the garment simulation module 111 determines that the user wears a medium-sized shirt based on the body measurements, then the display module 113 presents medium-sized shirts draped on the avatar of the user.

In some instances, the metadata information for the 3D garment model can include one or more model features. A model feature, which is an example of a fitting feature, refers to characteristics that are distinctive to the specific garment. For example, when the garment is a pair of jeans, the fitting features can include a waistband, a high hip (e.g., 3" down from top of waistband), a low hip (e.g., 6" down from top of waistband), a thigh measurement (e.g., circumference), a knee measurement, an inseam length, a fit (e.g., slim, normal, loose), and a cut (boot cut, relaxed, skinny, taper, straight). The list of model features is just representative, and is not intended to be exhaustive.

At operation 440, the garment simulation module 111 can calculate simulated forces acting on the 3D garment based on the material property of the garment. For example, the avatar generated at operation 410 is positioned inside the 3D garment model accessed at operation 430, and the simulated forces based on the positioning can be calculated. For example, the simulated forces can be calculated for each garment point in a tessellated 3D garment model.

In some instances, the garment simulation module 111 can use cloth physics technology to generate a 3D representation of a garment based on the material property of the garment. The material property can reflect the features of the fabric from which the garment was made. For example, garments made from different fabrics can hang or move differently based on the type of fabric used to manufacture the particular garment.

In some example embodiments, the simulated force can include a gravitational force, an elastic force, a friction force, or an aerodynamic force. Additionally, the garment simulation module 111 can further calculate the simulated forces acting on a subset of the garment points based on material properties of the garment. For example, the simulated forces can include a gravitational force and an elastic force, and the material properties of the garment can indicate a degree to which the garment is elastic. The material properties of the garment can include, but are not limited to, a sheerness value, a linear stiffness value, and a bending stiffness value.

At operation 450, the garment simulation module 111 drapes the 3D garment model on the avatar based on the calculated forces. The calculated forces and the cloth physics technology allows the user to see how the real physical item of clothing moves when worn by the user. In some instances, the garment simulation module 111 can generate an image of the 3D model descriptive of the garment draped on the generated avatar based on the calculated simulated forces. The garment simulation module 111 can configure at least a graphics processing unit to generate the image. The 3D model can be presented based on a simulated force. The presentation can be done by digitally draping the 3D model onto the avatar. Optionally, the display module 113 can present the generated avatar to a user. The display module 113 can present the generated image on a display of a device. The display module 113 can configure a user interface for the presentation.

FIG. 5 is a flowchart describing a method 500 for determining a gesture, according to example embodiments. The method 500 is governed by instructions stored in a computer-readable storage medium and that are executed by one or more processors of the network-based system 105. Each of the operations shown in FIG. 5 can correspond to instructions stored in a computer memory (e.g., memory 110) or computer-readable storage medium. Operations in the method 500 can be performed by the garment simulation module 111, the access module 112, or the display module 113. As shown in FIG. 5, the method 500 includes operations 510 and 520.

As previously mentioned, the first set of sensor data and the second set of sensor data are accessed at operations 210 and 220. The first set of sensor data includes initial sensor data received at a first time period and final sensor data received at a second time period, the second time period being after the first time period. The second set of sensor data can also include initial sensor data received at a first time period and final sensor data received at a second time period.

At operation 510, the garment simulation module 111 detects a difference between the initial sensor data and the final sensor data. For example, the garment simulation module 111 generates a first model based on the initial sensor data. Additionally, the garment simulation module 111 generates a second model based on the final sensor data. Then, the garment simulation module 111 detects a difference between the first model and the second model.

At operation 520, the garment simulation module 111 can determine a modification gesture based on the difference detected at operation 510. The difference between the first and second models corresponds to a gesture performed by the user between the first time period and the second time period. The gesture represents a command to modify the garment available for sale in the electronic marketplace on behalf of the user.

In some instances, the modification gesture is a hand pulling gesture. Additionally, the modifying the 3D garment model at operation 260 can include elongating a section of the 3D garment model based on the hand pulling gesture.

In some instances, the modification gesture is a hand stretching gesture. Additionally, the modifying the 3D garment model at operation 260 can include elongating a section of the 3D garment model based on the hand stretching gesture.

In some instances, the modification gesture is a hand pinching gesture. Additionally, the modifying the 3D garment model at operation 260 can include shortening a section of the 3D garment model based on the hand stretching gesture.

In some instances, the modification gesture is a pinching and pulling gesture. Additionally, the modifying the 3D garment model at operation 260 can include converting the 3D garment model to a smaller size based on the pinching and pulling gesture.

In some instances, the modification gesture is a pinching and tucking gesture. Additionally, the modifying the 3D garment model at operation 260 can include converting the 3D garment model to a larger size based on the pinching and tucking gesture.

Additionally, the garment simulation module 111 can determine a confirmation gesture using similar techniques to those described at operations 510 and 520. For example, the garment simulation module 111 can prompt the user to confirm that the gesture represents the command (e.g., the user intended to issue the command when making the gesture). Based on the user confirming that the gesture represents the command, the garment simulation module 111 can initiate the action within the electronic marketplace on behalf of the user.

Although individual operations of the methods 200, 300, 400, and 500 are illustrated and described as separate operations, one or more of the individual operations can be performed concurrently, or omitted from the methods. Additionally, the operations can be performed in a different order. These and other variations, modifications, additions, and improvements fall within the scope of the subject matter herein.

Figure 6:
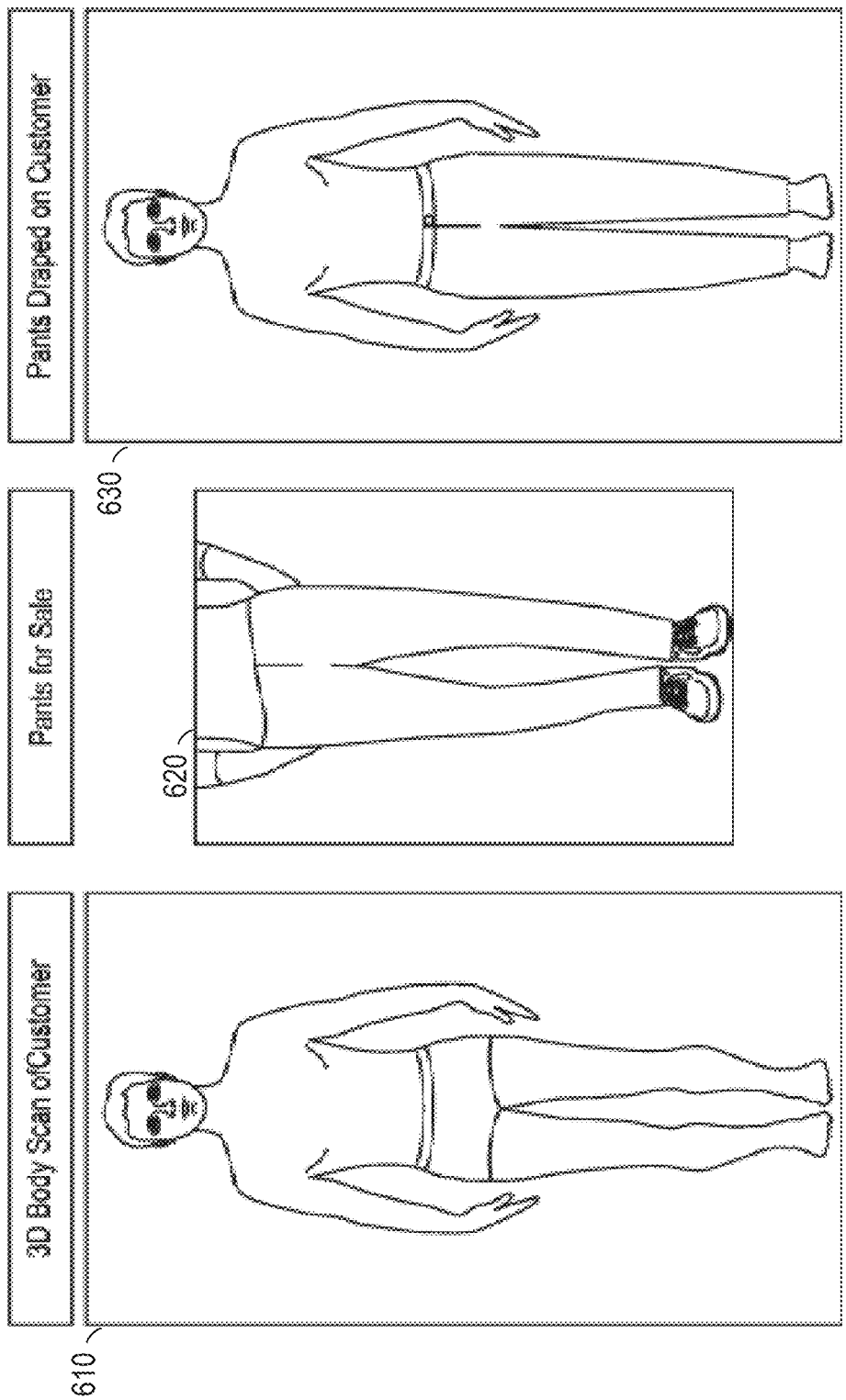
FIG. 6 illustrates a method of facilitating the online purchase of garments, in accordance with example embodiments.

According to various example embodiments, one or more of the methodologies described herein can facilitate the online purchase of garments. As illustrated in FIG. 6, some example embodiments described herein can generate an avatar of a customer 610 based on accessed sensor data from operations 210 and 220. Additionally, a 3D garment model of a garment for sale 620 can be accessed at operation 430. Subsequently, the 3D garment model can be draped on the avatar 630 at operation 450. Furthermore, the customer can modify the 3D garment using a modification gesture, and confirm the modification using a confirmation gesture.

Figure 7:
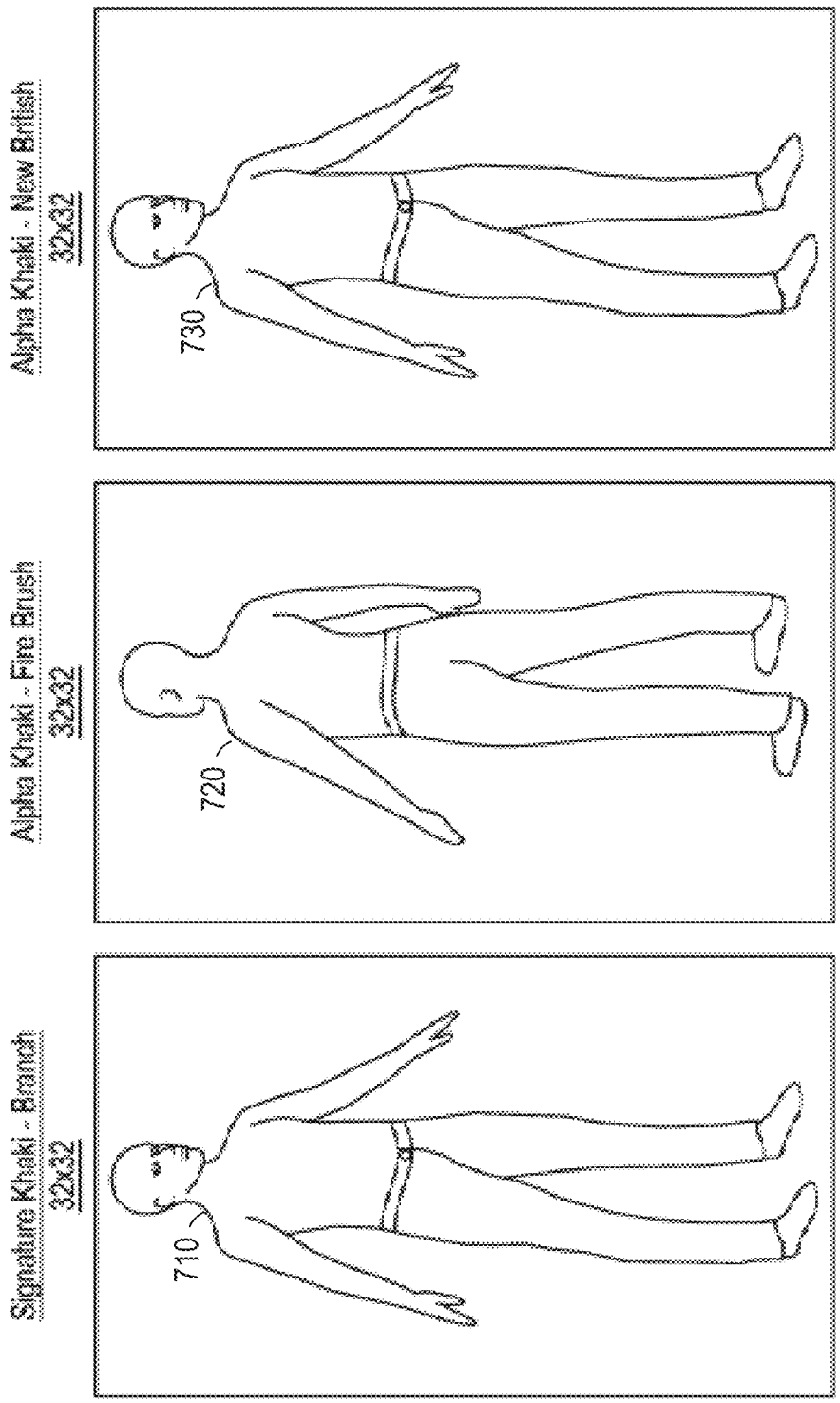
FIG. 7 illustrates a method of facilitating the online purchase of garments, in accordance with example embodiments.

Moreover, one or more of the methodologies described herein can facilitate the visualization of different styles of a garment on the avatar using the garment simulation module 111. For example, FIG. 7 illustrates how a customer can visualize the look and feel of different pairs of khakis. In this example, the customer can visualize that the signature khaki 710 is a looser fit, in comparison to the alpha khaki. Additionally, the customer can visualize how the fire-brush-colored alpha khaki 720 and the new-British-colored alpha khaki 730 look in relation to the customer's avatar. For example, the avatar can include characteristics of the customer, such as skin tone, hair style, and so on.

According to various example embodiments, one or more of the methodologies described herein can facilitate the online purchase of garments. Additionally, embodiments can support the in-store purchase of garments using digital techniques to convey the same information without the user necessarily being online.

When these effects are considered in aggregate, one or more of the methodologies described herein can obviate a need for certain efforts or resources that otherwise would be involved in determining body measurements of a user. Efforts expended by a user in generating user-specific body models can be reduced by one or more of the methodologies described herein. Computing resources used by one or more machines, databases, or devices (e.g., within the network-based system 105) can similarly be reduced. Examples of such computing resources include processor cycles, network traffic, memory usage, data storage capacity, power consumption, and cooling capacity.

Figure 8:
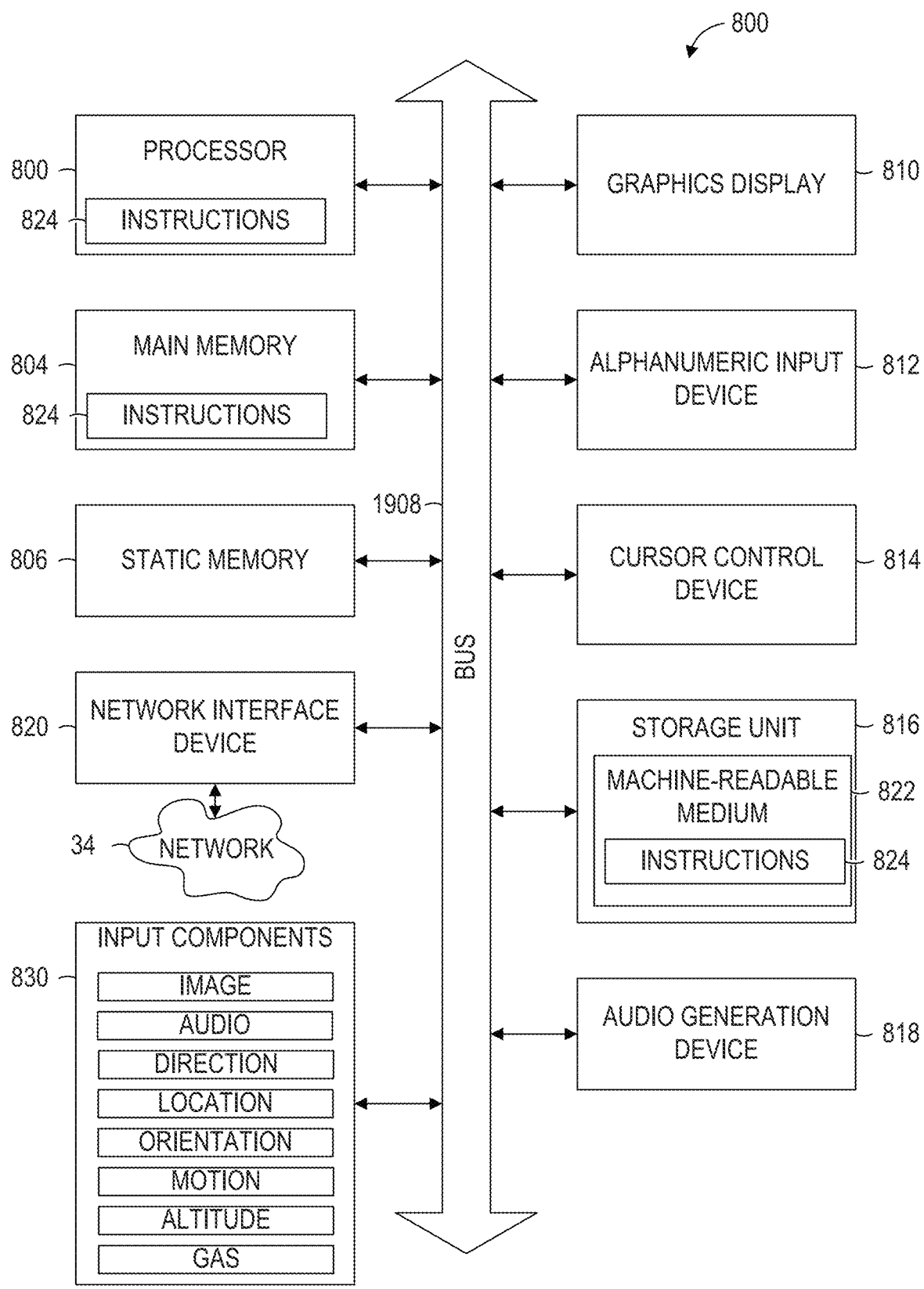
FIG. 8 is a block diagram illustrating components of a machine, according to some example embodiments, able to read instructions from a machine-readable medium and perform any one or more of the methodologies discussed herein.

FIG. 8 is a block diagram illustrating components of a machine 800, according to some example embodiments, able to read instructions 824 from a machine-readable medium 822 (e.g., a non-transitory machine-readable medium, a machine-readable storage medium, a computer-readable storage medium, or any suitable combination thereof) and perform any one or more of the methodologies discussed herein, in whole or in part. Specifically, FIG. 8 shows the machine 800 in the example form of a computer system (e.g., a computer) within which the instructions 824 (e.g., software, a program, an application, an applet, an app, or other executable code) for causing the machine 800 to perform any one or more of the methodologies discussed herein can be executed, in whole or in part. The network-based system 105, devices 130, and 140 can be examples of the machine 800.

In alternative embodiments, the machine 800 operates as a standalone device or can be connected (e.g., networked) to other machines. In a networked deployment, the machine 800 can operate in the capacity of a server machine or a client machine in a server-client network environment, or as a peer machine in a distributed (e.g., peer-to-peer) network environment. The machine 800 can be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 824, sequentially or otherwise, that specify actions to be taken by that machine. Further, while only a single machine is illustrated, the term "machine" shall also be taken to include any collection of machines that individually or jointly execute the instructions 824 to perform all or part of any one or more of the methodologies discussed herein.

The machine 800 includes a processor 802 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 804, and a static memory 806, which are configured to communicate with each other via a bus 808. The processor 802 can contain microcircuits that are configurable, temporarily or permanently, by some or all of the instructions 824 such that the processor 802 is configurable to perform any one or more of the methodologies described herein, in whole or in part. For example, a set of one or more microcircuits of the processor 802 can be configurable to execute one or more modules (e.g., software modules) described herein.

The machine 800 can further include a graphics display 810 (e.g., a plasma display panel (PDP), a light emitting diode (LED) display, a liquid crystal display (LCD), a projector, a cathode ray tube (CRT), or any other display capable of displaying graphics or video). The machine 800 can also include an alphanumeric input device 812 (e.g., a keyboard or keypad), a cursor control device 814 (e.g., a mouse, a touchpad, a trackball, a joystick, a motion sensor, an eye tracking device, or another pointing instrument), a storage unit 816, an audio generation device 818 (e.g., a sound card, an amplifier, a speaker, a headphone jack, or any suitable combination thereof), and a network interface device 820.

The storage unit 816 includes the machine-readable medium 822 (e.g., a tangible and non-transitory machine-readable storage medium) on which are stored the instructions 824 embodying any one or more of the methodologies or functions described herein. The instructions 824 can also reside, completely or at least partially, within the main memory 804, within the processor 802 (e.g., within the processor's cache memory), or both, before or during execution thereof by the machine 800. Accordingly, the main memory 804 and the processor 802 can be considered machine-readable media (e.g., tangible and non-transitory machine-readable media). The instructions 824 can be transmitted or received over a network 34 via the network interface device 820. For example, the network interface device 820 can communicate the instructions 824 using any one or more transfer protocols (e.g., hypertext transfer protocol (HTTP)).

The machine-readable medium 822 can include a magnetic or optical disk storage device, solid state storage devices such as flash memory, or another non-volatile memory device or devices. The computer-readable instructions stored on the computer-readable storage medium are in source code, assembly language code, object code, or another instruction format that is interpreted by one or more processors.

In some example embodiments, the machine 800 can be a portable computing device, such as a smartphone or tablet computer, and have one or more additional input components 830 (e.g., sensors or gauges). Examples of such input components 830 include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components can be accessible and available for use by any of the modules described herein.

As used herein, the term "memory" refers to a machine-readable medium able to store data temporarily or permanently and can be taken to include, but not be limited to, random-access memory (RAM), read-only memory (ROM), buffer memory, flash memory, and cache memory. While the machine-readable medium 822 is shown in an example embodiment to be a single medium, the term "machine-readable medium" should be taken to include a single medium or multiple media (e.g., a centralized or distributed database, or associated caches and servers) able to store the instructions 824. The term "machine-readable medium" shall also be taken to include any medium, or combination of multiple media, that is capable of storing the instructions 824 for execution by the machine 800, such that the instructions 824, when executed by one or more processors of the machine 800 (e.g., the processor 802), cause the machine 800 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

The foregoing description, for purposes of explanation, has been described with reference to specific embodiments. However, the illustrative discussions above are not intended to be exhaustive or to limit the present disclosure to the precise forms disclosed. Many modifications and variations are possible in view of the above teachings. The embodiments were chosen and described in order to best explain the principles of the present disclosure and its practical applications, to thereby enable others skilled in the art to best utilize the present disclosure and various embodiments with various modifications as are suited to the particular use contemplated.

Throughout this specification, plural instances can implement components, operations, or structures described as a single instance. Although individual operations of one or more methods are illustrated and described as separate operations, one or more of the individual operations can be performed concurrently, and nothing requires that the operations be performed in the order illustrated. Structures and functionality presented as separate components in example configurations can be implemented as a combined structure or component. Similarly, structures and functionality presented as a single component can be implemented as separate components. These and other variations, modifications, additions, and improvements fall within the scope of the subject matter herein.

Certain embodiments are described herein as including logic or a number of components, modules, or mechanisms. Modules can constitute software modules (e.g., code stored or otherwise embodied on a machine-readable medium or in a transmission medium), hardware modules, or any suitable combination thereof. A "hardware module" is a tangible (e.g., non-transitory) unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) can be configured by software (e.g., an application or application portion) as a hardware module that operates to perform certain operations as described herein.

In some embodiments, a hardware module can be implemented mechanically, electronically, or any suitable combination thereof. For example, a hardware module can include dedicated circuitry or logic that is permanently configured to perform certain operations. For example, a hardware module can be a special-purpose processor, such as a field programmable gate array (FPGA) or an ASIC. A hardware module can also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, and such a tangible entity can be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor can be configured as respectively different special-purpose processors (e.g., comprising different hardware modules) at different times. Software (e.g., a software module) can accordingly configure one or more processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules can be achieved, for example, through the storage and retrieval of information in memory structures to which the multiple hardware modules have access. For example, one hardware module can perform an operation and store the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors can constitute processor-implemented modules that operate to perform one or more operations or functions described herein. As used herein, "processor-implemented module" refers to a hardware module implemented using one or more processors.

Similarly, the methods described herein can be at least partially processor-implemented, a processor being an example of hardware. For example, at least some of the operations of a method can be performed by one or more processors or processor-implemented modules. As used herein, "processor-implemented module" refers to a hardware module in which the hardware includes one or more processors. Moreover, the one or more processors can also operate to support performance of the relevant operations in a "cloud computing" environment or as a "software as a service" (SaaS). For example, at least some of the operations can be performed by a group of computers (as examples of machines including processors), with these operations being accessible via a network (e.g., the Internet) and via one or more appropriate interfaces (e.g., an application program interface (API)).

The performance of certain operations can be distributed among the one or more processors, not only residing within a single machine, but deployed across a number of machines. In some example embodiments, the one or more processors or processor-implemented modules can be located in a single geographic location (e.g., within a home environment, an office environment, or a server farm). In other example embodiments, the one or more processors or processor-implemented modules can be distributed across a number of geographic locations.

Some portions of the subject matter discussed herein can be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities can take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like can refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method comprising:
obtaining sensor data from one or more sensors that describes a body in a three-dimensional (3D) physical space;
presenting, on a display of a display device, a 3D garment model draped on an avatar that mirrors the body in the 3D physical space;
detecting, based on a difference between initial sensor data and subsequent sensor data that is obtained from the one or more sensors and describes the body in the 3D physical space, a modification gesture in relation to a body part of the 3D garment model draped on the avatar mirroring the body in the 3D physical space;
digitally tailoring the 3D garment model draped on the avatar mirroring the body by modifying the body part of the 3D garment model; and
presenting, on the display, a tailored 3D garment model draped on the avatar mirroring the body.

2. The method of claim 1, wherein modifying the body part of the 3D garment model comprises modifying a length of the body part of the 3D garment model based on the detected modification gesture.

3. The method of claim 1, wherein the body part of the 3D garment model comprises a leg, a sleeve, a waist, or a neck of the 3D garment model.

4. The method of claim 1, wherein modifying the body part of the 3D garment model comprises altering a fit of the body part of the 3D garment model in relation to the avatar based on the detected modification gesture.

5. The method of claim 1, wherein detecting the modification gesture in relation to the body part of the 3D garment model includes detecting a pulling gesture in relation to the body part of the 3D garment model.

6. The method of claim 1, wherein detecting the modification gesture in relation to the body part of the 3D garment model includes detecting a pinching gesture and a pulling gesture in relation to the body part of the 3D garment model.

7. The method of claim 1, wherein detecting the modification gesture in relation to the body part of the 3D garment model includes detecting squeezing in relation to the body part of the 3D garment model.

8. The method of claim 1, further comprising sending a request to a manufacturer of a garment modeled by the 3D garment model, the request requesting to modify the garment and including custom sizing information based on the modification gesture.

9. A system comprising:
at least one processor; and
memory storing instructions that are executable by the at least one processor to perform operations including:
obtaining sensor data from one or more sensors that describes a body in a three-dimensional (3D) physical space;
presenting, on a display of a display device, a 3D garment model draped on an avatar that mirrors the body in the 3D physical space;
detecting, based on the sensor data, a modification gesture in relation to a body part of the 3D garment model draped on the avatar mirroring the body;
digitally tailoring the 3D garment model draped on the avatar mirroring the body by modifying the body part of the 3D garment model; and
presenting, on the display, a tailored 3D garment model draped on the avatar mirroring the body.

10. The system of claim 9, wherein modifying the body part of the 3D garment model comprises modifying a length of the body part of the 3D garment model based on the detected modification gesture.

11. The system of claim 9, wherein the body part of the 3D garment model comprises a leg, a sleeve, a waist, or a neck of the 3D garment model.

12. The system of claim 9, wherein modifying the body part of the 3D garment model comprises altering a fit of the body part of the 3D garment model in relation to the avatar based on the detected modification gesture.

13. The system of claim 9, wherein detecting the modification gesture in relation to the body part of the 3D garment model includes detecting a pulling gesture in relation to the body part of the 3D garment model.

14. The system of claim 9, wherein the operations further comprise sending a request to a manufacturer of a garment modeled by the 3D garment model, the request requesting to modify the garment and including custom sizing information based on the modification gesture.

15. Non-transitory computer-readable storage media comprising instructions that, when executed by one or more processors of a computing device, cause the computing device to perform operations including:
obtaining sensor data from one or more sensors that describes a body in a 3D physical space;
presenting, on a display of a display device, a 3D garment model draped on an avatar that mirrors the body in the 3D physical space;
detecting, based on the sensor data, a modification gesture in relation to a body part of the 3D garment model draped on the avatar mirroring the body;
digitally tailoring the 3D garment model draped on the avatar mirroring the body by modifying the body part of the 3D garment model; and
presenting, on the display, a tailored 3D garment model draped on the avatar mirroring the body.

16. The non-transitory computer-readable storage media of claim 15, wherein modifying the body part of the 3D garment model comprises modifying a length of the body part of the 3D garment model based on the detected modification gesture.

17. The non-transitory computer-readable storage media of claim 15, wherein the body part of the 3D garment model comprises a leg, a sleeve, a waist, or a neck of the 3D garment model.

18. The non-transitory computer-readable storage media of claim 15, wherein modifying the body part of the 3D garment model comprises altering a fit of the body part of the 3D garment model in relation to the avatar based on the detected modification gesture.

19. The non-transitory computer-readable storage media of claim 15, wherein detecting the modification gesture in relation to the body part of the 3D garment model includes detecting at least one of a pulling gesture, a stretching gesture, a pinching gesture, a tucking gesture, and a nipping gesture in relation to the body part of the 3D garment model.

20. The non-transitory computer-readable storage media of claim 15, wherein the operations further comprise sending a request to a manufacturer of a garment modeled by the 3D garment model, the request requesting to modify the garment and including custom sizing information based on the modification gesture.

* * * * *